(12) United States Patent
Blabas et al.

(10) Patent No.: US 12,336,623 B2
(45) Date of Patent: Jun. 24, 2025

(54) UNIVERSAL ORAL CARE TOOL

(71) Applicant: Sage Products, LLC, Cary, IL (US)

(72) Inventors: Brett C. Blabas, Naperville, IL (US); Ronald C. Cagle, Crystal Lake, IL (US); Thomas Keaty, Jr., Crystal Lake, IL (US); Jay Roberts, Barrington, IL (US); David P. Beck, Cary, IL (US); Heather K. Mercier, Geneva, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 18/738,430

(22) Filed: Jun. 10, 2024

(65) Prior Publication Data
US 2024/0324763 A1    Oct. 3, 2024

Related U.S. Application Data

(63) Continuation of application No. 18/012,841, filed as application No. PCT/US2021/042012 on Jul. 16, 2021.
(Continued)

(51) Int. Cl.
*A61C 17/02*    (2006.01)
*A46B 9/00*    (2006.01)
(Continued)

(52) U.S. Cl.
CPC .......... *A46B 15/0053* (2013.01); *A46B 9/005* (2013.01); *A46B 9/025* (2013.01);
(Continued)

(58) Field of Classification Search
CPC .......... A46B 9/005; A46B 9/025; A46B 9/04; A46B 11/0041; A46D 1/0238; A46C 17/0208
(Continued)

(56) References Cited

U.S. PATENT DOCUMENTS

| 670,023 A | 3/1901 | Jump |
| 884,256 A | 4/1908 | Addie |

(Continued)

FOREIGN PATENT DOCUMENTS

| CA | D189737 A | 12/2022 |
| DE | 29618648 U1 | 12/1996 |

(Continued)

OTHER PUBLICATIONS

International Search Report and Written Opinion for International Application No. PCT/US2021/042012, mailed Oct. 28, 2021, 17 pages.
(Continued)

*Primary Examiner* — Jacob K Ackun
(74) *Attorney, Agent, or Firm* — FOLEY & LARDNER LLP

(57) ABSTRACT

A device for providing oral care includes at least one lumen fluidly coupled to a brush head. The lumen is adapted to suction fluid via an aperture disposed within the brush head. The brush head may be provided an oral cleaning fluid to facilitate cleaning of oral anatomy. The oral cleaning fluid may be provided within a cup provided within a containment assembly coupled to the oral care tool. Alternatively, or in addition, the cleaning fluid may be provided via fluid reservoir fluidly coupled to the oral care tool. The brush head comprises a bristles section and a foam section.

20 Claims, 22 Drawing Sheets

Related U.S. Application Data

(60) Provisional application No. 63/121,627, filed on Dec. 4, 2020, provisional application No. 63/053,467, filed on Jul. 17, 2020.

(51) Int. Cl.
*A46B 9/02* (2006.01)
*A46B 9/04* (2006.01)
*A46B 11/00* (2006.01)
*A46B 15/00* (2006.01)
*A46D 1/00* (2006.01)

(52) U.S. Cl.
CPC ............ *A46B 9/04* (2013.01); *A46B 11/0041* (2013.01); *A46B 11/0065* (2013.01); *A46D 1/0238* (2013.01); *A61C 17/0208* (2013.01); *A46B 2200/1066* (2013.01)

(58) Field of Classification Search
USPC ...... 15/320; 206/361, 362.2, 362.3, 576, 581
See application file for complete search history.

(56) References Cited

U.S. PATENT DOCUMENTS

| | | |
|---|---|---|
| 1,254,714 A | 1/1918 | McCombs |
| 1,283,403 A | 10/1918 | Eustis |
| 1,705,050 A | 3/1929 | Taylor |
| 1,723,944 A | 8/1929 | Marsh |
| 1,770,478 A | 7/1930 | Burnett |
| 2,084,540 A | 6/1937 | Smith |
| 2,161,854 A | 6/1939 | Copell |
| 2,186,600 A | 1/1940 | Behrens |
| D143,320 S | 12/1945 | Horton |
| D145,045 S | 6/1946 | Plasket |
| D186,435 S | 10/1959 | Wilson |
| 3,002,722 A | 10/1961 | Cote |
| 3,220,543 A | 11/1965 | McCord et al. |
| 3,275,274 A | 9/1966 | Hutcheon |
| 3,286,835 A | 11/1966 | Crane, Jr. |
| 3,822,783 A | 7/1974 | Mortensen |
| 3,840,932 A | 10/1974 | Balamuth et al. |
| 3,927,762 A | 12/1975 | Zdarsky et al. |
| 4,106,621 A | 8/1978 | Sorenson |
| 4,317,605 A | 3/1982 | Alissandratos |
| 4,324,331 A | 4/1982 | Ignasiak |
| 4,328,894 A | 5/1982 | Edell |
| 4,570,652 A | 2/1986 | Chavez |
| D294,805 S | 3/1988 | Boyer |
| 4,750,652 A | 6/1988 | Grant |
| 4,854,760 A | 8/1989 | Unidec |
| 4,880,111 A | 11/1989 | Bagwell et al. |
| 4,915,219 A | 4/1990 | Ottimo |
| 4,976,379 A | 12/1990 | Sloan |
| 4,995,509 A | 2/1991 | Kornfeind |
| 5,022,559 A | 6/1991 | Condon |
| 5,095,924 A | 3/1992 | Stanfield |
| D332,401 S | 1/1993 | Araujo et al. |
| 5,246,046 A | 9/1993 | Schramm |
| 5,288,047 A | 2/1994 | Pan |
| 5,379,895 A | 1/1995 | Foslien |
| 5,386,908 A | 2/1995 | Sinn |
| 5,392,909 A | 2/1995 | Hackett |
| 5,396,678 A | 3/1995 | Bredall et al. |
| 5,445,631 A | 8/1995 | Uchida |
| D363,017 S | 10/1995 | Noble |
| D363,211 S | 10/1995 | Noble |
| D367,999 S | 3/1996 | Mccallum |
| 5,495,876 A | 3/1996 | Schramm |
| D373,823 S | 9/1996 | Baldwin |
| 5,765,254 A | 6/1998 | O'Halloran |
| 5,816,408 A | 10/1998 | Indelicato |
| 5,862,913 A | 1/1999 | Chou |
| RE36,131 E | 3/1999 | Schramm |
| 5,908,057 A | 6/1999 | Schramm |
| 5,950,648 A | 9/1999 | Skrocki et al. |
| 6,059,106 A | 5/2000 | Baker et al. |
| 6,082,999 A | 7/2000 | Tcherny et al. |
| D429,461 S | 8/2000 | Rowlay |
| 6,108,849 A | 8/2000 | Weihrauch |
| 6,131,737 A | 10/2000 | Marshall |
| 6,213,777 B1 | 4/2001 | Seitzinger |
| 6,280,112 B1 | 8/2001 | Vieu |
| 6,283,311 B1 | 9/2001 | Lee |
| 6,311,837 B1 | 11/2001 | Blaustein et al. |
| 6,402,104 B1 | 6/2002 | Smith |
| 6,418,940 B1 | 7/2002 | Tcherny et al. |
| 6,543,100 B1 | 4/2003 | Finley et al. |
| 6,595,822 B1 | 7/2003 | Thai |
| 6,601,699 B1 | 8/2003 | Naredo |
| 6,638,131 B1 | 10/2003 | Thai |
| 6,702,113 B2 | 3/2004 | Marino |
| 6,857,928 B2 | 2/2005 | Thai |
| 6,889,829 B2 | 5/2005 | Lev et al. |
| D508,200 S | 8/2005 | Cagle |
| 6,945,397 B2 | 9/2005 | Brattesani et al. |
| D510,822 S | 10/2005 | Spiers et al. |
| D512,908 S | 12/2005 | Proudfit |
| D513,382 S | 1/2006 | Proudfit |
| D520,356 S | 5/2006 | Kellar et al. |
| D523,610 S | 6/2006 | Kissell |
| 7,124,894 B1 | 10/2006 | Dobos |
| RE39,443 E | 12/2006 | Schramm |
| 7,244,161 B2 | 7/2007 | Thai |
| 7,320,398 B2 | 1/2008 | Bertl et al. |
| D571,207 S | 6/2008 | Rozanski |
| D571,208 S | 6/2008 | Rozanski |
| 7,399,133 B1 | 7/2008 | Eversole |
| 7,524,230 B2 | 4/2009 | Thai |
| D597,829 S | 8/2009 | Ma et al. |
| D614,489 S | 4/2010 | Doster |
| 7,784,429 B2 | 8/2010 | Chiodo |
| D630,528 S | 1/2011 | Dombrowski et al. |
| 7,967,519 B2 | 6/2011 | Gueret |
| RE42,610 E | 8/2011 | Schramm |
| 8,091,702 B1 | 1/2012 | Keip |
| D654,288 S | 2/2012 | Lecoutre |
| D654,724 S | 2/2012 | Lecoutre |
| D660,690 S | 5/2012 | Mixides |
| 8,181,786 B1 | 5/2012 | Alas |
| 8,245,844 B2 | 8/2012 | Sorrentino et al. |
| 8,251,076 B2 | 8/2012 | Souza |
| D666,903 S | 9/2012 | Mcintosh et al. |
| D681,444 S | 5/2013 | Oja et al. |
| 8,506,192 B2 | 8/2013 | Allbritton |
| D691,884 S | 10/2013 | Kwon |
| D698,639 S | 2/2014 | Fletcher et al. |
| 8,734,420 B2 | 5/2014 | Ariagno et al. |
| D715,641 S | 10/2014 | Spinos |
| D752,427 S | 3/2016 | Moskovich et al. |
| D767,393 S | 9/2016 | Giorgis |
| 9,456,956 B1 | 10/2016 | Webster et al. |
| D803,678 S | 11/2017 | Chen et al. |
| D803,679 S | 11/2017 | Chen et al. |
| 9,833,605 B2 | 12/2017 | Sanders et al. |
| D806,530 S | 1/2018 | Mack |
| D813,660 S | 3/2018 | Tyner |
| D816,478 S | 5/2018 | Moskovich et al. |
| D826,706 S | 8/2018 | Company |
| 10,058,649 B2 | 8/2018 | Le Maner |
| D829,544 S | 10/2018 | Kocon et al. |
| 10,327,539 B2 | 6/2019 | Beck et al. |
| D853,226 S | 7/2019 | Geringer et al. |
| D853,831 S | 7/2019 | Geringer et al. |
| 10,687,612 B2 | 6/2020 | Beck et al. |
| D901,312 S | 11/2020 | Fowler et al. |
| D954,551 S | 6/2022 | Moak et al. |
| D988,868 S | 6/2023 | Fowler et al. |
| D995,288 S | 8/2023 | Okoroafor et al. |
| 12,029,311 B2 * | 7/2024 | Blabas ............... A46B 11/0065 |
| 2001/0032796 A1 | 10/2001 | Rubenstein |
| 2001/0035413 A1 | 11/2001 | Thai |
| 2002/0121449 A1 | 9/2002 | Bowie |
| 2004/0129580 A1 | 7/2004 | Cochran et al. |

(56) References Cited

U.S. PATENT DOCUMENTS

| | | |
|---|---|---|
| 2004/0211683 A1 | 10/2004 | Barham et al. |
| 2004/0240928 A1 | 12/2004 | Trocino |
| 2005/0087464 A1 | 4/2005 | Brattesani et al. |
| 2005/0161454 A1 | 7/2005 | Nehren et al. |
| 2006/0021166 A1 | 2/2006 | Hills |
| 2006/0048791 A1 | 3/2006 | Mehes et al. |
| 2006/0131189 A1 | 6/2006 | Lee et al. |
| 2006/0208142 A1 | 9/2006 | Adams |
| 2006/0260635 A1 | 11/2006 | Dabney |
| 2006/0289030 A1 | 12/2006 | Pho |
| 2007/0220754 A1 | 9/2007 | Barbaro et al. |
| 2008/0209650 A1 | 9/2008 | Brewer et al. |
| 2009/0159487 A1* | 6/2009 | Tacoma .................. B25J 1/04 15/210.1 |
| 2009/0197220 A1 | 8/2009 | Cindrich |
| 2011/0297574 A1 | 12/2011 | Lecoutre |
| 2012/0048760 A1 | 3/2012 | Karey et al. |
| 2012/0170967 A1 | 7/2012 | Faison |
| 2012/0241347 A1 | 9/2012 | Bowers et al. |
| 2013/0037441 A1* | 2/2013 | Pacheco ............. A46B 11/0041 206/581 |
| 2013/0140310 A1 | 6/2013 | Lien et al. |
| 2013/0230349 A1 | 9/2013 | Dontfraid |
| 2013/0340185 A1 | 12/2013 | Patel et al. |
| 2014/0008266 A1 | 1/2014 | Lee et al. |
| 2015/0014492 A1 | 1/2015 | Sharpe et al. |
| 2015/0282603 A1 | 10/2015 | Jimenez et al. |
| 2016/0039393 A1 | 2/2016 | Zhuo |
| 2016/0198990 A1 | 7/2016 | Betancur et al. |
| 2016/0206412 A1 | 7/2016 | Bock |
| 2017/0095071 A1 | 4/2017 | Osmond et al. |
| 2017/0311707 A1 | 11/2017 | Beck et al. |
| 2018/0071506 A1 | 3/2018 | Sanders et al. |
| 2018/0085515 A1 | 3/2018 | Mide et al. |
| 2018/0132605 A1 | 5/2018 | Fowler et al. |
| 2018/0132989 A1 | 5/2018 | Deane et al. |
| 2018/0161491 A1 | 6/2018 | Sanders et al. |
| 2018/0161492 A1 | 6/2018 | Sanders et al. |
| 2018/0168786 A1 | 6/2018 | Meng et al. |
| 2018/0352948 A1 | 12/2018 | Bryzek et al. |
| 2019/0307237 A1 | 10/2019 | Beck et al. |
| 2020/0305589 A1 | 10/2020 | Beck et al. |
| 2020/0390230 A1 | 12/2020 | Fowler et al. |
| 2020/0405046 A1 | 12/2020 | Deane et al. |
| 2021/0059393 A1 | 3/2021 | Yang et al. |
| 2022/0015526 A1 | 1/2022 | Fowler et al. |
| 2022/0177211 A1 | 6/2022 | Beck et al. |
| 2022/0225757 A1 | 7/2022 | Fowler et al. |
| 2023/0092350 A1 | 3/2023 | Fowler et al. |
| 2023/0240436 A1 | 8/2023 | Gross et al. |
| 2023/0248183 A1 | 8/2023 | McLain |

FOREIGN PATENT DOCUMENTS

| | | |
|---|---|---|
| EM | 006852877-0001 | 9/2019 |
| EM | 006852877-0002 | 9/2019 |
| EM | 006852877-0003 | 9/2019 |
| FR | 2606615 A1 | 5/1988 |
| GB | 9 006 852877-0001 | 9/2019 |
| GB | 9 006 852877-0002 | 9/2019 |
| GB | 9 006 852877-0003 | 9/2019 |
| JP | H08-052210 A | 2/1996 |
| JP | 3059317 U | 7/1999 |
| JP | 2000-159266 A | 6/2000 |
| JP | 2002-234553 A | 8/2002 |
| JP | 2010-013186 A | 1/2010 |
| JP | 1725082 S | 9/2022 |
| KR | 10-2009-0133048 A | 12/2009 |
| KR | 20090133048 A | 12/2009 |
| KR | 10-2010-0050871 A | 5/2010 |
| KR | 20130094557 A | 8/2013 |
| WO | WO-00/58164 A1 | 10/2000 |
| WO | WO-2012/087317 | 6/2012 |
| WO | WO-2013/090659 | 6/2013 |
| WO | WO-2016/059035 | 4/2016 |
| WO | WO-2018/090050 A1 | 5/2018 |
| WO | WO-2020/118235 | 6/2020 |
| WO | WO-2022/001607 A1 | 1/2022 |
| WO | WO-2022/016075 A1 | 1/2022 |

OTHER PUBLICATIONS

International Search Report and Written Opinion for International Application No. PCT/US2021/061716, mailed Mar. 7, 2022, 16 pages.

International Search Report and Written Opinion for International Application No. PCT/US2019/065042, mailed Apr. 7, 2020, 11 pages.

Pharmacy Counter Space Cardboard Display Box For Medicine Drugs. [online] Published on Sep. 22, 18. Retrieved Jan. 3, 20 from URL: http://www.cardboardpalletdisplay.com/sale-6122822-pharmacy-counter-space-cardboard-display-box-for-medicine-drugs.html.

Sage Self Oral Care Toothbrush. [online] Published on Nov. 30, 2019. Retrieved Jan. 3, 2020 from URL: https://www.stryker.com/us/en/sage/products/sage-self-oral-care.html.

Sage Self Oral Care, posted date not available [retrieved Aug. 28, 2023]. Retrieved from internet, https:/www.stryker.com/us/en/sage/products/sage-self-oral-care.html (Year: 2023) 12 pages.

Suction Toothbrush Kit Sage, posted date not available [retrieved Aug. 28, 2023]. Retrieved from internet, https://mms.mckesson.com/product/1177792/Sage-Products-6301 (Year: 2023) 3 pages.

Translation of KR 10-2009-0133048 A; provided by International Searching Authority for International Search Report and Written Opinion of International Application No. PCT/US2019/065042, mailed Apr. 7, 2020, 4 pages.

* cited by examiner

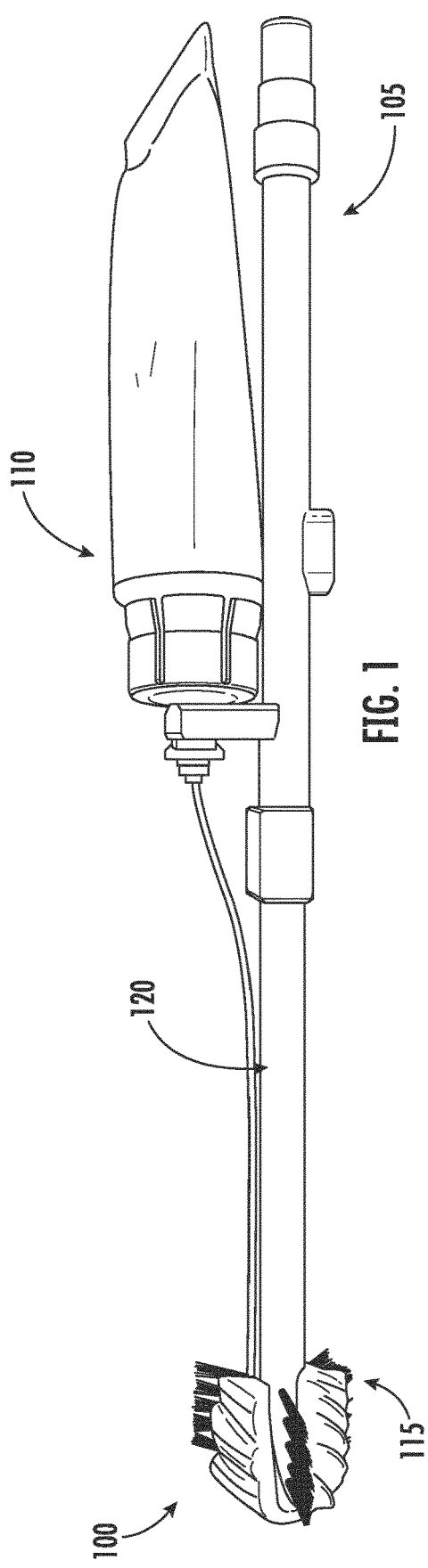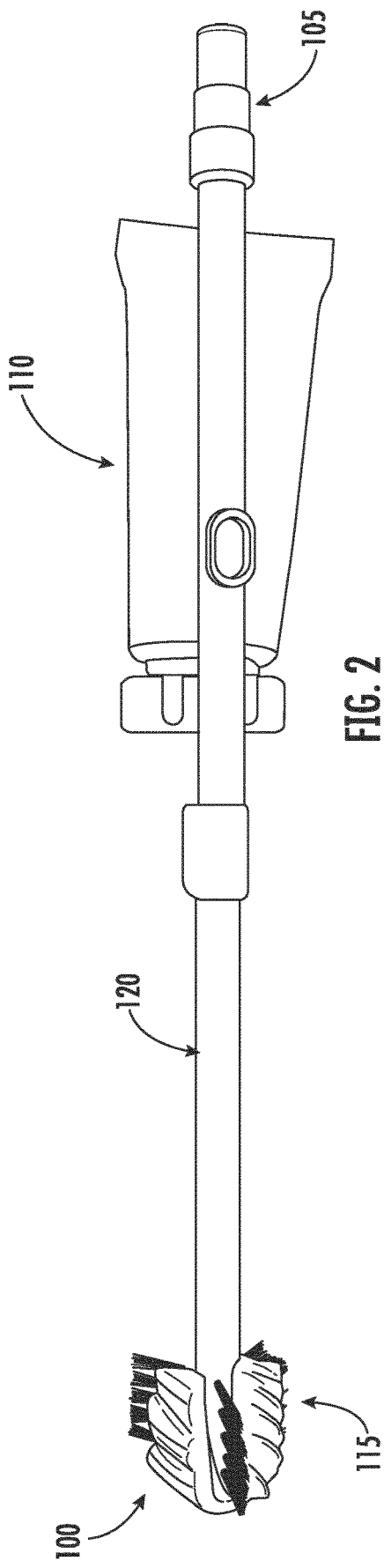

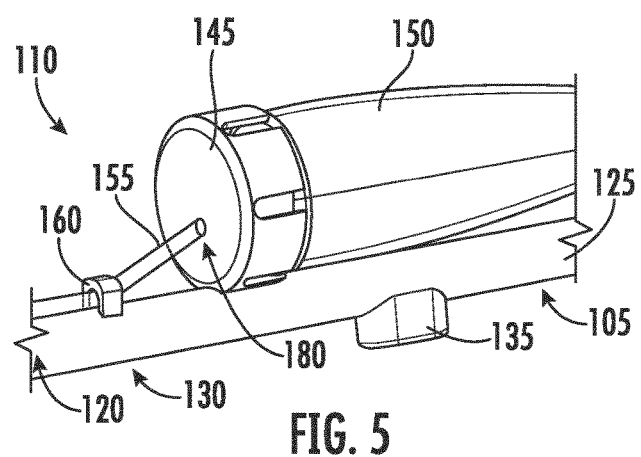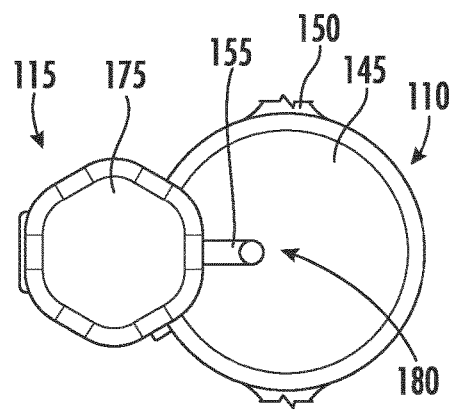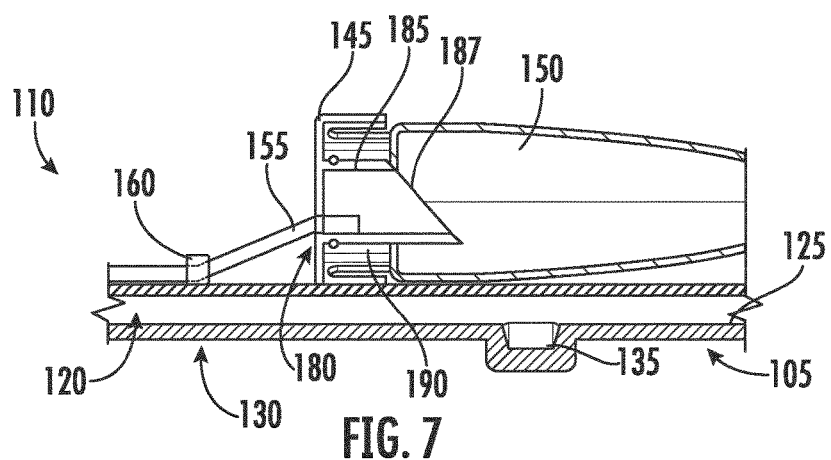

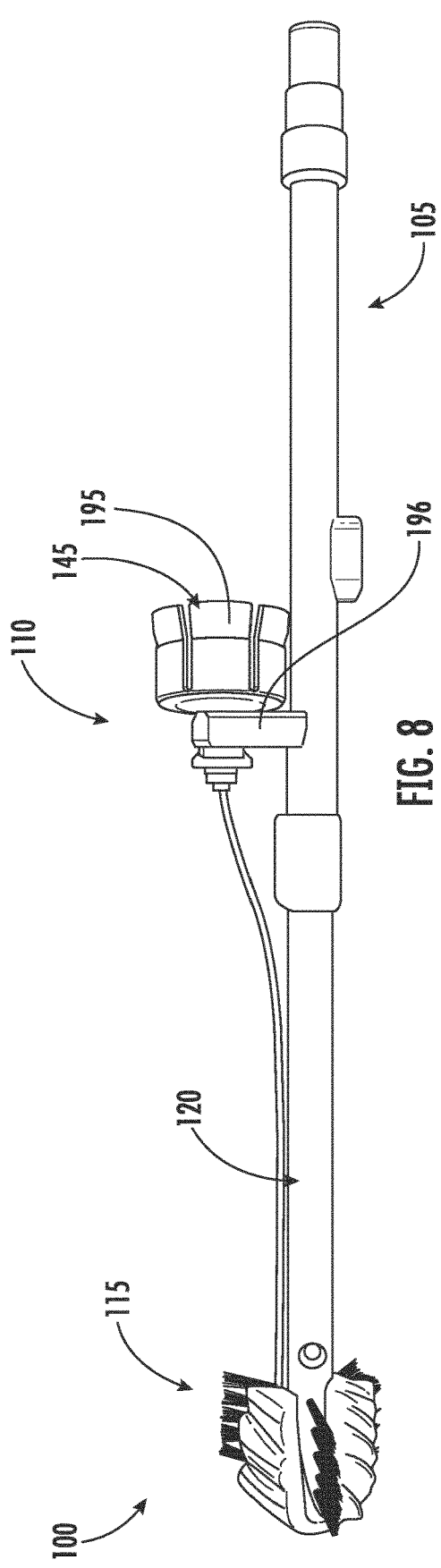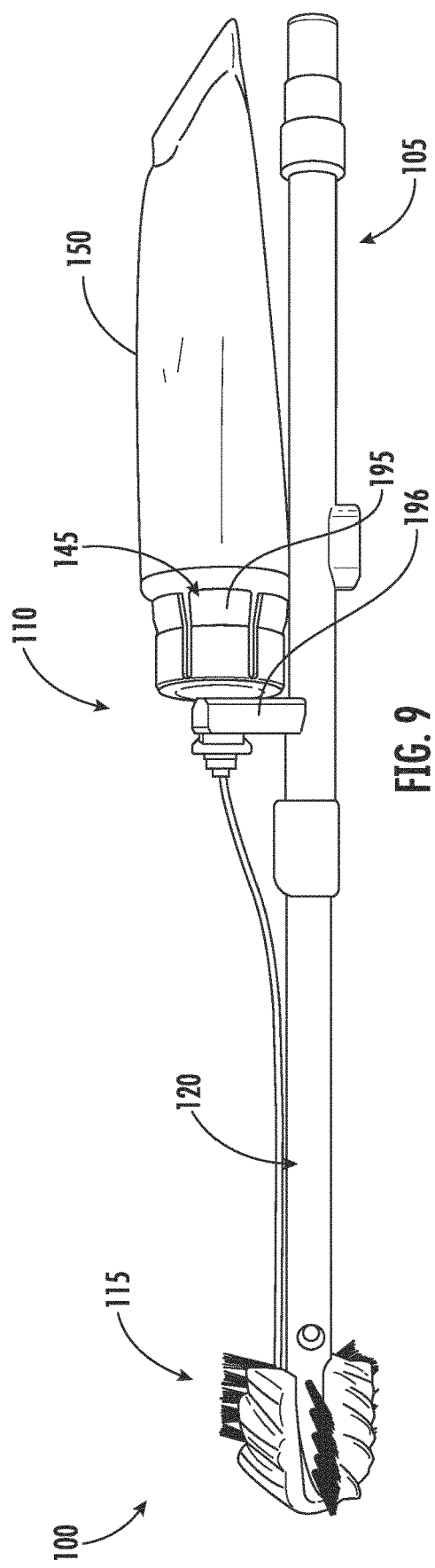

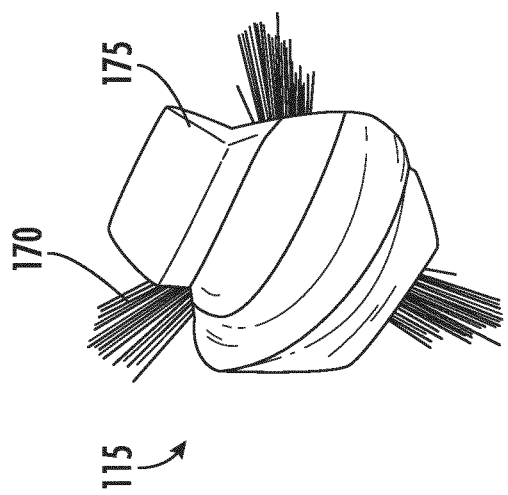
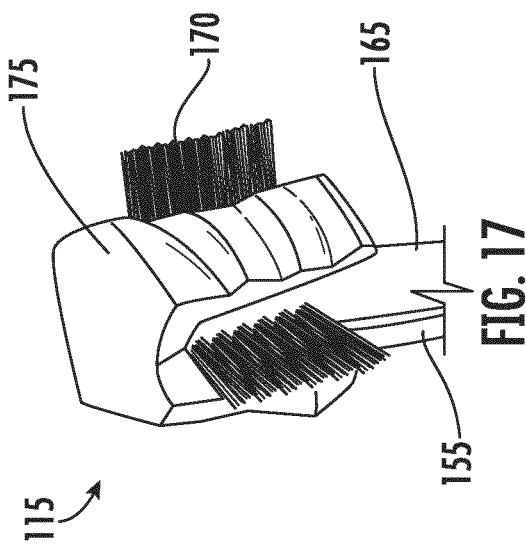
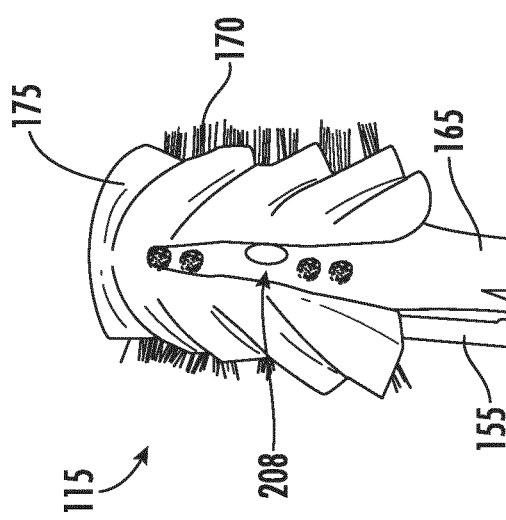
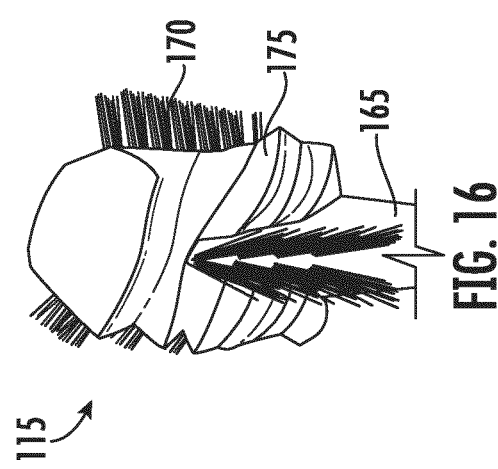

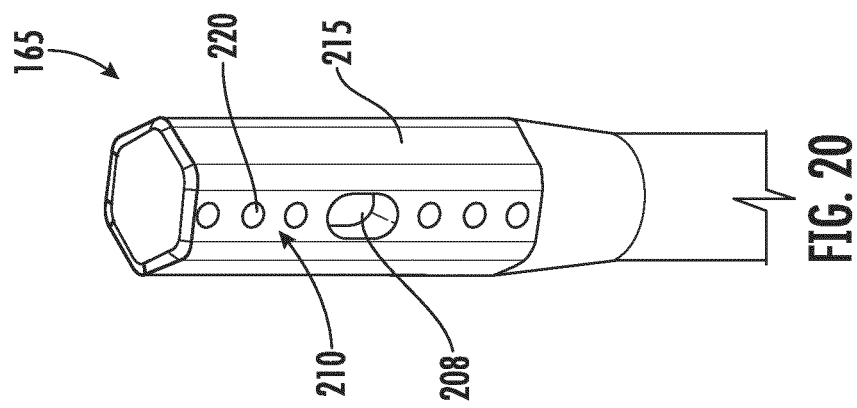
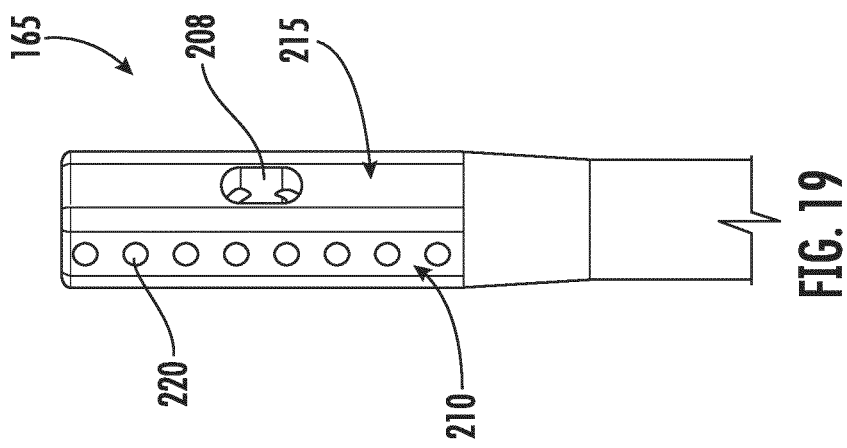
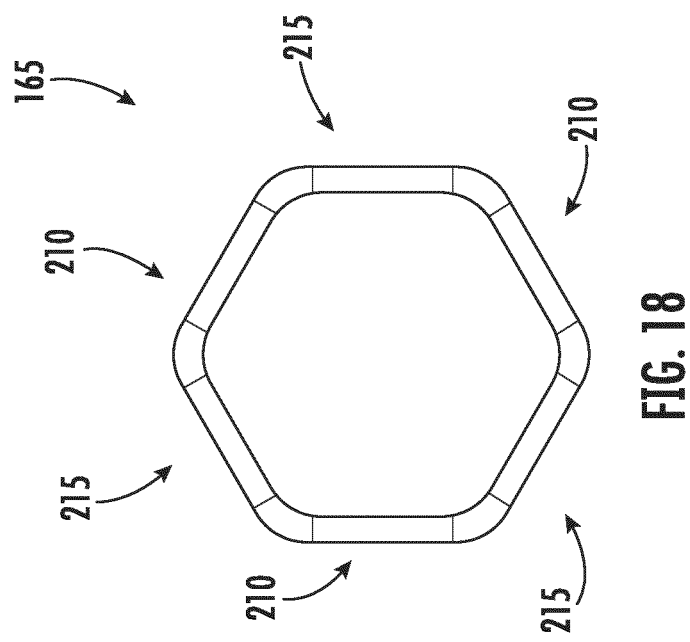

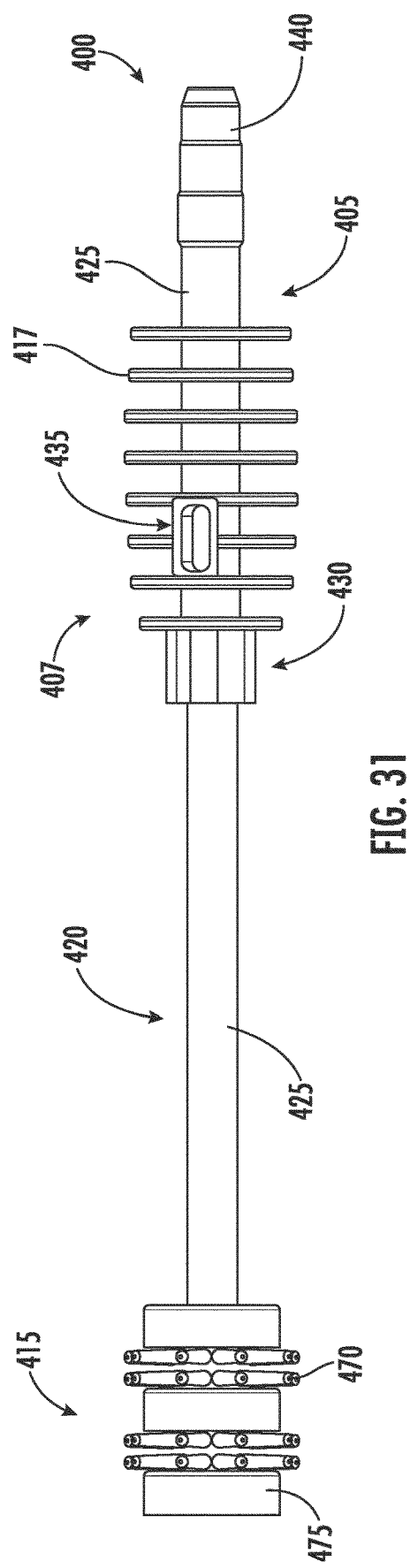
FIG. 31
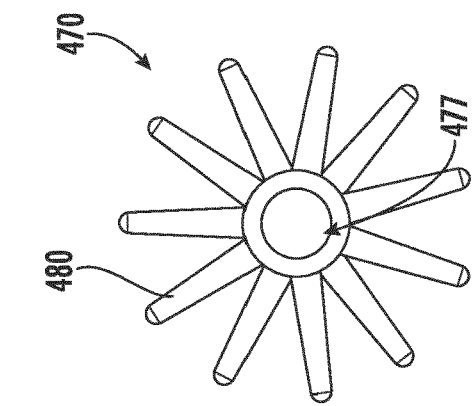
FIG. 32
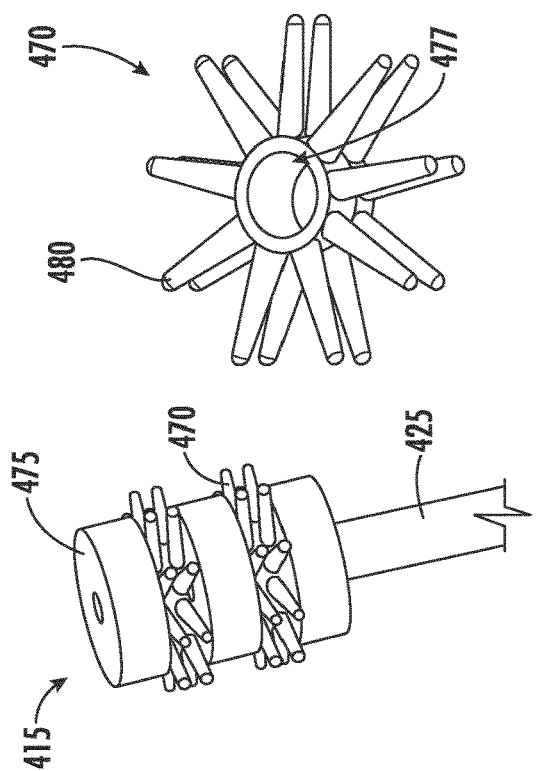
FIG. 33
FIG. 34
FIG. 35
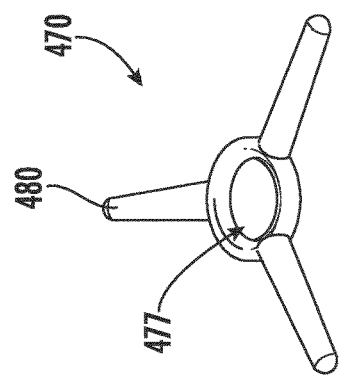

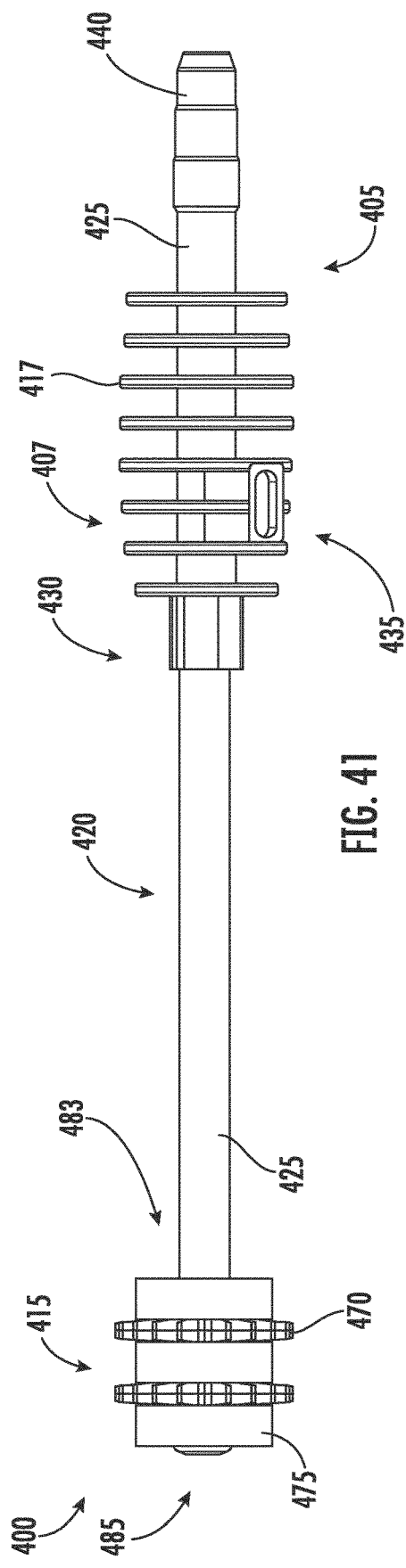
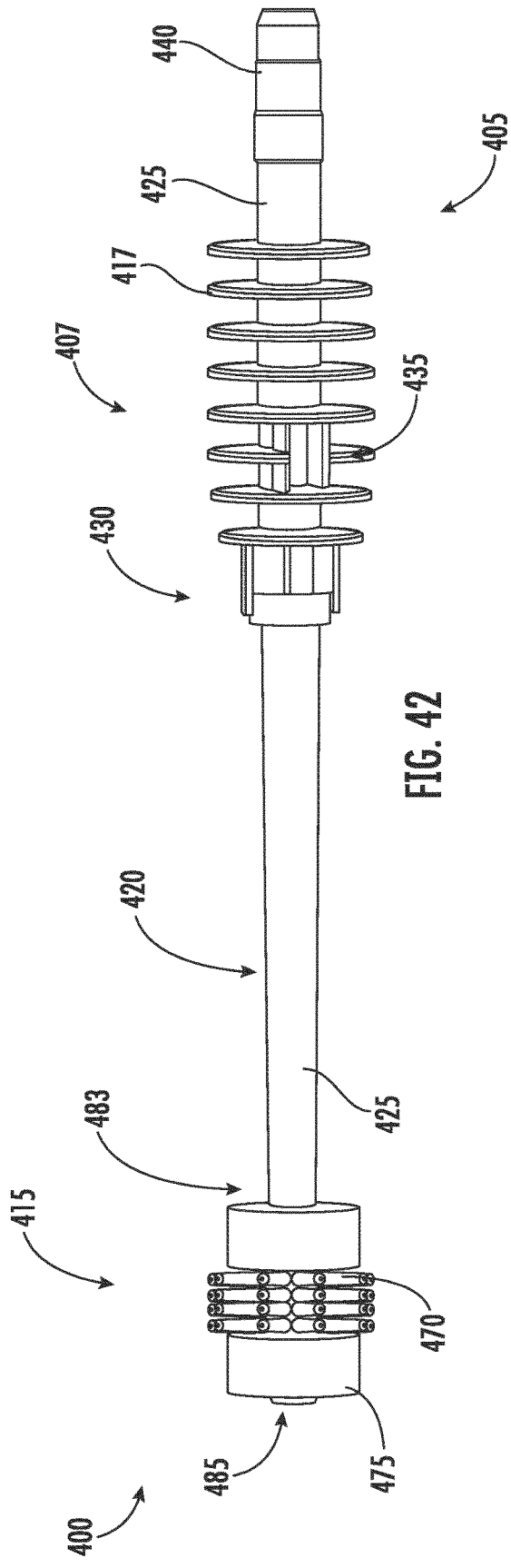
FIG. 41
FIG. 42

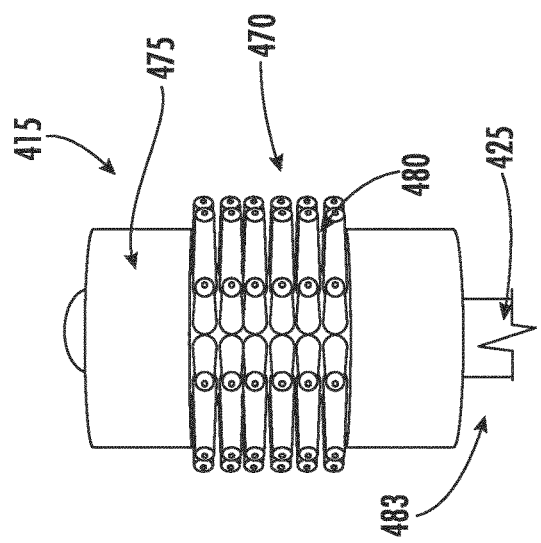
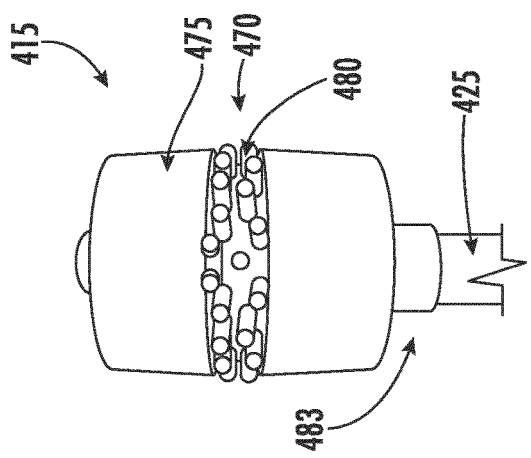
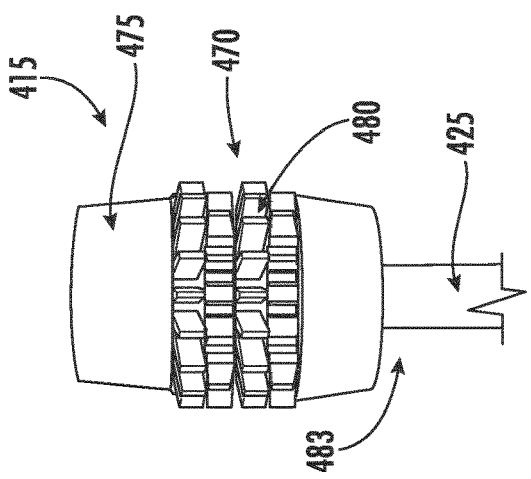
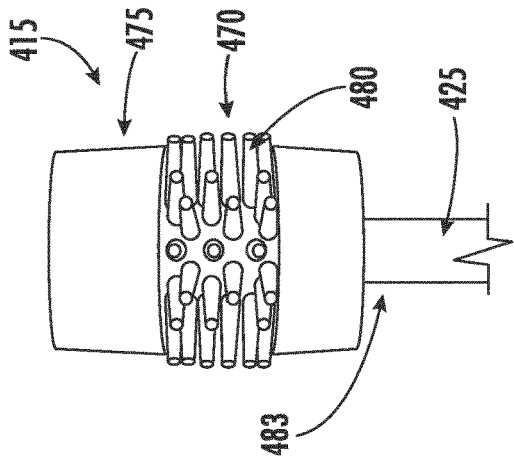
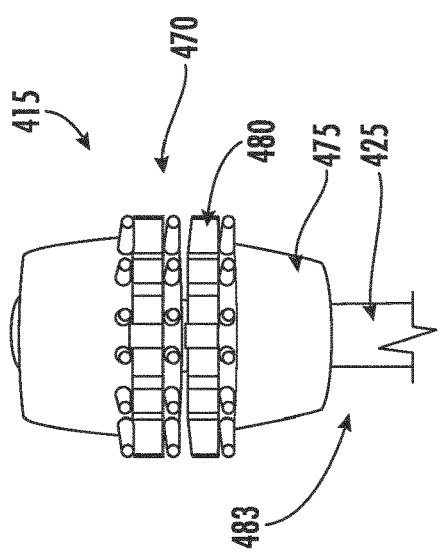
FIG. 43
FIG. 44
FIG. 45
FIG. 46
FIG. 47

UNIVERSAL ORAL CARE TOOL

CROSS-REFERENCE TO RELATED APPLICATIONS

This application is a continuation of U.S. patent application Ser. No. 18/012,841, filed Dec. 23, 2022, which is a 371 U.S. National Application of International Application No. PCT/US2021/042012, filed Jul. 16, 2021, which claims the benefit of U.S. Provisional Application No. 63/053,467, filed Jul. 17, 2020, all of which are incorporated herein by reference in their entireties. International Application No. PCT/US2021/042012, filed Jul. 16, 2021, also claims the benefit of U.S. Provisional Application 63/121,627, filed Dec. 4, 2020, which is incorporated herein by reference in its entirety.

BACKGROUND

The present disclosure relates generally to the field of oral care in clinical settings. More specifically, the present disclosure relates to suction-enabled oral care tools.

Oral care tools used in clinical settings are often modeled after standard oral care brushes and thus frequently include static brush designs that must be specifically oriented and maneuvered to clean anatomy within an oral cavity of a patient. Such designs are often impractical in clinical settings, particularly when the oral cavity may contain one or more long-term medical equipment devices, such as one or more respiratory devices (e.g., ventilator). In addition, many oral care tools require assembly/disassembly of one or more interchangeable components to enable cleaning of the oral cavity. Such tools are often unwieldy and time consuming for clinicians and/or health care practitioners who must determine which components may be best suited for a particular oral cavity or a portion thereof.

Accordingly, it would be advantageous to provide a universal oral care tool that may adapt to a broad range of oral cavities having varying oral anatomy and containing one or more medical devices (e.g., ventilator suction piece).

SUMMARY

One aspect of the present disclosure relates to a device for providing oral care. The device includes a first lumen, a second lumen fluidly coupled to the first lumen, and a brush head coupled to a distal end of the first lumen. The first lumen is adapted to suction fluid via an aperture disposed within the brush head, the second lumen is adapted to provide fluid from a fluid reservoir and deliver the fluid to the brush head, and the brush head comprises a bristles section and a foam section.

In various embodiments, the device further includes a cap portion coupled to the second lumen, wherein the cap portion is configured to receive the fluid reservoir such that the fluid reservoir is fluidly coupled to the second lumen. In some embodiments, the second lumen provides fluid from the fluid reservoir and delivers the fluid to the brush head responsive to deformation applied to the fluid reservoir. In other embodiments, the fluid reservoir is a tube including a deformable material. In yet other embodiments, the cap portion includes a cuspate piece configured to puncture a seal associated with the fluid reservoir. In various embodiments, the brush head is axially symmetric about a longitudinal axis of the oral care device. In some embodiments, the brush head has a hexagonal cross-section. In other embodiments, the brush head is configured to have two opposing sides and wherein each side comprises a portion of the foam section and a portion of the bristles section.

In various embodiments, each of the bristles section and the foam section includes a plurality of subsections, and wherein each of the plurality of the bristles subsections and each of the plurality of foam subsections are equally distributed about an outer circumference of the brush head. In some embodiments, each of the plurality of the bristles subsections is adjacent to a corresponding foam subsection of the plurality of foam subsections. In other embodiments, the foam section and the bristles section are superimposed on the brush head such that bristles within the bristles section protrude through the foam section. In yet other embodiments, the device further includes a flex portion disposed between the first lumen and the brush head, wherein the flex portion is configured to deform in response to a force applied to the brush head. In various embodiments, the flex portion includes a flexible coupling configured to couple the first lumen to the brush head. In some embodiments, a circumference of the flex portion is smaller than a circumference of the first lumen. In other embodiments, the first lumen and the second lumen are integrally formed.

Another aspect of the present disclosure relates to a method for providing oral care using an oral care device. The method includes inserting an oral care device within an oral cavity, wherein the oral care device includes a first lumen and a second lumen, and coupling the oral care device to both a suctioning apparatus and a fluid reservoir. The oral care device is configured to suction, by the first lumen, fluid dispersed within the oral cavity. The oral care device is further configured to deliver, by the second lumen fluidly coupled to the first lumen, fluid from the fluid reservoir to a brush head coupled to each of the first lumen and the second lumen. The brush head includes a bristles section and a foam section.

In various embodiments, the oral care device is axially symmetric about a longitudinal axis of the oral care device. In some embodiments, the oral care device further includes a cap portion coupled to the first lumen, and wherein the cap portion includes a cuspate piece configured to puncture a seal within the fluid reservoir.

Another aspect of the present disclosure relates to an oral device kit. The kit includes a fluid reservoir and an oral care device configured to receive fluid from the fluid reservoir. The oral care device includes a first lumen, a second lumen fluidly coupled to the first lumen, and a brush head coupled to a distal end of the first lumen. The first lumen is adapted to suction fluid within an oral cavity via a hole disposed within the brush head, the second lumen is adapted to provide fluid from the reservoir and deliver the fluid to the brush head, and the brush head includes a bristles section and a foam section.

In various embodiments, the oral care device further includes a cap portion coupled to the second lumen, and wherein the cap portion is configured to receive the fluid reservoir such that the fluid reservoir is fluidly coupled with the second lumen.

Another aspect of the present disclosure relates to a device for providing oral care. The device includes a lumen and a brush head coupled to a distal end of the lumen. The lumen is adapted to suction fluid via an aperture disposed within the brush head, the brush head includes at least one bristles section and at least one foam section, the at least one bristles section and the at least one foam section are axially layered within the brush head, and the at least one bristles section includes a plurality of bristles radially extending from a central axis of the brush head.

In various embodiments, each of the plurality of bristles is conically shaped. In some embodiments, each of the plurality of bristles is substantially rectangular in shape. In other embodiments, the at least one foam section includes a first foam section and a second foam section. In yet other embodiments, the at least one bristles section is disposed between the first foam section and the second foam section. In various embodiments, the at least one bristles section includes at least three rows of bristles. In some embodiments, the at least one bristles section is greater in thickness than at least one of the first foam section or the second foam section. In other embodiments, the at least one bristles section is smaller in thickness than at least one of the first foam section or the second foam section. In yet other embodiments, the at least one bristles section includes a first bristles section and a second bristles section, wherein the at least one foam section further includes a third foam section. In various embodiments, the first bristles section is disposed between the first foam section and the second foam section, and the second bristles section is disposed between the second foam section and the third foam section. In some embodiments, the brush head includes a plurality of faces, the plurality of faces including a first set of faces and a second set of faces, wherein the first set of faces are configured to receive the at least one bristles section and wherein the second set of faces are configured to receive the at least one foam section. In other embodiments, each of the first set of faces includes a plurality of apertures, the plurality of apertures configured to receive one or more bristles from the at least one bristles section. In yet other embodiments, each of the second set of faces includes a substantially smooth surface, and wherein the at least one foam section is adaptable to be adhered to the surface of each of the second set of faces.

Another aspect of the present disclosure relates to a device for providing oral care. The device includes a lumen and a brush head coupled to a distal end of the lumen. The lumen is adapted to suction fluid via an aperture disposed within the brush head. The brush head includes a first foam section and a second foam section and a bristles section. The first foam section, the second foam section, and the bristles section are axially layered within the brush head. The bristles section is disposed between the first foam section and the second foam section, and the at least one bristles section includes a plurality of bristles radially extending from a central axis of the brush head.

In various embodiments, the brush head further includes a core portion, the core portion having first region and a second region, and wherein the first region is configured to couple to the distal end of the lumen. In some embodiments, the first region has a larger radius than a radius of the distal end of the lumen, and wherein the first region of the core portion is configured to fit over the distal end of the lumen. In other embodiments, the aperture is disposed within the second region.

Yet another aspect of the present disclosure relates to an oral device kit. The kit includes a fluid reservoir and an oral care device configured to receive fluid from the fluid reservoir. The oral care device includes a lumen and a brush head coupled to a distal end of the lumen. The lumen is adapted to suction fluid via an aperture disposed within the brush head, the brush head includes at least one bristles section and at least one foam section, the at least one bristles section and the at least one foam section are axially layered within the brush head, and the at least one bristles section includes a plurality of bristles radially extending from a central axis of the brush head.

In various embodiments, the kit further includes a package having a first region and a second region, the first region being configured to encase a handle portion and a stem portion of lumen and the second region being configured to include a reservoir containing an oral cleaning solution. In some embodiments, the first region of the package includes a first portion and a second portion, wherein the second portion is configured to slide relative to the first portion.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which:

FIG. 1 shows a side view of an oral care tool, according to an exemplary embodiment.

FIG. 2 shows a bottom view of the oral care tool of FIG. 1, according to an exemplary embodiment.

FIG. 5 shows a side perspective view of an oral care tool near a cap portion, according to an exemplary embodiment.

FIG. 6 shows an end view of an oral care tool near the cap portion, according to an exemplary embodiment.

FIG. 7 shows a side cross-sectional view of the oral care tool of FIG. 4 taken along line 11-11 of FIG. 4, according to an exemplary embodiment.

FIG. 8 shows a side view of an oral care tool having a snap-type cap portion, according to an exemplary embodiment.

FIG. 9 shows a side view of the oral care tool of FIG. 8, wherein the snap-type cap portion is coupled to a fluid reservoir, according to an exemplary embodiment.

FIGS. 14-17 show alternate views of a hexagonal brush head of the oral care tool of FIGS. 1 and 8, according to an exemplary embodiment.

FIGS. 18-20 show alternate views of a brush head stem for a hexagonal brush head of an oral care tool, according to an exemplary embodiment.

FIG. 31 shows a side view of an oral care tool having a layered brush head configuration, according to an exemplary embodiment.

FIG. 32 shows a perspective view of the oral care tool of FIG. 31, near the brush head.

FIGS. 33-35 show alternate views of radially extending rounded bristles, according to various exemplary embodiments.

FIGS. 41-42 show alternate side views of oral care tools having a layered brush head configuration, according to various exemplary embodiments.

FIGS. 43-47 show alternate side views of brush heads for an oral care tool, according to various exemplary embodiments.

Figure 3:
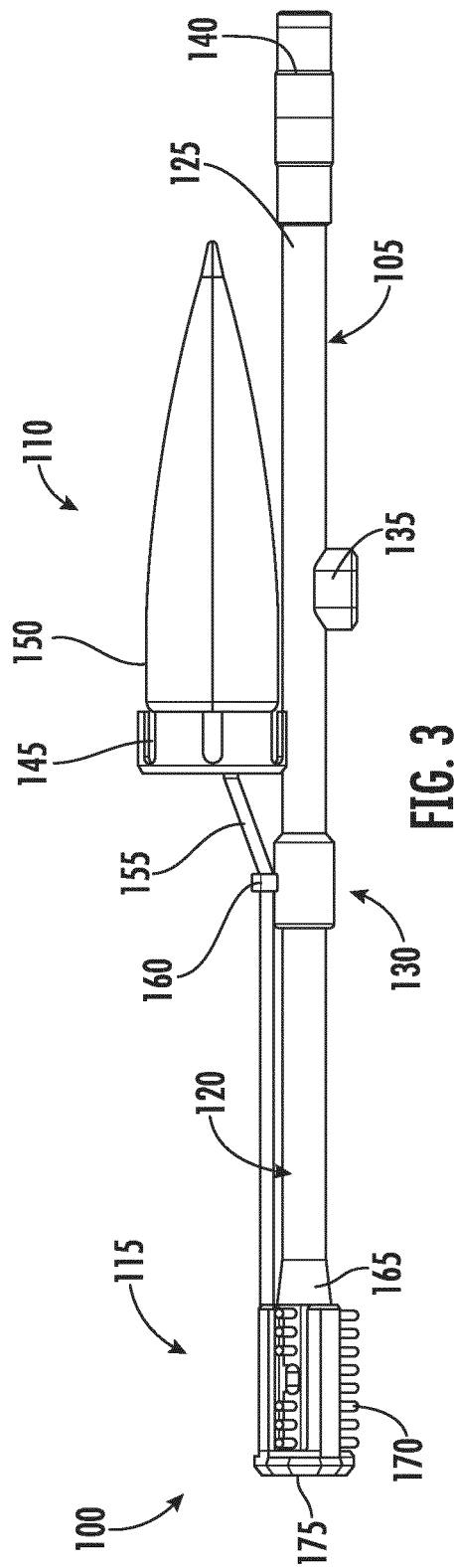
FIG. 3 shows a side view of an oral care tool, according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Various embodiments of the disclosure relate to an oral care tool having a first lumen and a second lumen, wherein the first lumen is configured to suction fluid within an oral cavity and the second lumen is configured to provide fluid to the oral cavity. A terminal end of each of the first and second lumen may be fluidly coupled to a brush head, which is positioned at a distal end of the oral care tool. The first lumen may be fluidly coupled to one or more suction devices to facilitate removal of fluid from the oral cavity. The second lumen may be fluidly coupled to a fluid reservoir, wherein the fluid reservoir may contain a cleaning solution or gel, which may be used to clean anatomy within the oral cavity. Manipulation of the fluid reservoir (e.g., squeezing, twisting, pressing, etc.) may cause the contained fluid to pass through the second lumen to the brush head, wherein it may be used to aid in cleansing and/or debridement.

In various embodiments, the fluid reservoir may be coupled to an outer surface of the first lumen via a cap portion. The fluid reservoir may have an opening portion, wherein the opening portion is configured to fit within an interior region of the cap portion. In various embodiments, the fluid reservoir and the cap portion may include threaded regions, wherein the fluid reservoir may be coupled to the cap portion through rotating, twisting, or screwing into an interior region of the cap portion.

In various embodiments, the cap portion may include one or more features to enable coupling of the fluid reservoir via a snap connection. In various embodiments, the opening portion of the fluid reservoir may include a membrane or seal that may be removed or pierced to enable fluid flow out of the fluid reservoir. In various embodiments, the cap portion may include a cuspate portion, wherein the cuspate portion may be configured to puncture the membrane or seal included within the opening portion of the fluid reservoir. In various embodiments, the cap portion may include a port (e.g., aperture), which may be configured to receive the second lumen and thus enable supply of fluid from within the fluid reservoir to the brush head.

In various embodiments, the brush head may be axially symmetric such that the brush head is uniform about a central axis. In various embodiments, the brush head may include adjacently placed bristle portions and foam portions, wherein the bristle portions may enable debridement of oral anatomy. In various embodiments, the brush head may have a hexagonal cross-section, wherein each corresponding hexagonal face may include either a foam section or a bristles section. In various embodiments, the bristles may be coupled within an interior portion of the foam head and extend through apertures formed within the brush head to an exterior region surrounding the brush head. In various embodiments, a foam portion may be fitted and/or coupled to an exterior surface of the brush head such that sections of the foam portion may be adjacent to one or more bristles sections. In various embodiments, the brush head may include two opposing faces, wherein each face includes a bristles section and a foam section. In various embodiments, the form portion and the bristles portion may form rows, which may be twisted about the brush head so as to form a helical arrangement. In various embodiments, the brush head may include an aperture, which is fluidly coupled to the first lumen and through which fluid within the oral cavity may be suctioned into the first lumen to be carried away from the oral cavity.

In various embodiments, the brush head may be configured to rotate relative to a central axis of the oral care tool. In various embodiments, the first lumen may include a flexible portion, which may have a higher degree of elasticity compared to remaining portions of the first lumen. The flexible portion may then flex in response to an application of force on an end of the brush head. In various embodiments, the first lumen may be flexibly coupled to the brush head via a flexible connector or coupling, wherein the connector or coupling enables movement of the brush head (e.g., rotation, swivel, pivot) about the flexible connector or coupling.

In various embodiments, the brush head may be configured to include one or more bristles sections and foam sections to be layered axially thereon. In various embodiments, the bristles sections may be configured to be disposed between adjacent foam sections. In various embodiments, the bristles within each of the bristles sections may be conically and/or flat shaped.

In various embodiments, the brush head may include a core portion, which may be removably coupled to the stem portion to facilitate changing or replacement of the brush head thereon. In various embodiments, the core portion may be integrally formed with the stem portion.

In various embodiments, the oral care tool may be stored or packaged within a collapsible package. In an embodiment, the package may include one or more mutually coupled layers, which may contain the oral care tool therebetween. In various embodiments, the package may include an elongated portion configured to contain the handle portion and stem portion of the oral care tool, an end portion, and a collapsible portion disposed therebetween. In various embodiments, the collapsible portion may include one or more accordion-type ridges or folds, which may collapse in response to an axial load. Upon collapsing of the collapsible portion, the brush head of the oral care tool may enter a cup disposed within the end portion of the package to enable absorption of an oral cleaning fluid or solution contained therein.

In various embodiments, the oral care tool may be coupled to a containment assembly to prevent premature entry of the brush head into the cup. The containment assembly may include a cage portion disposed above a support portion having a plurality of legs, which may be configured to enable the oral care tool and the containment assembly to remain upright. In various embodiments, the containment assembly may include a seal, which may be opened or removed via displacement or deformation of a protruding feature. In various embodiments, the deformation or displacement of the protruding feature may open or remove the seal to enable the brush head to enter the cup.

In various embodiments, the oral care tool may be fluidly coupled to a fluid reservoir, which may be configured to supply an oral cleaning fluid or solution to the lumen and brush head. In various embodiments, the fluid reservoir may be a pouch couplable to the oral care tool via a fluid connector. In various embodiments, the fluid reservoir includes a pouch, which contains one or more oral cleaning fluids or solutions. In various embodiments, the pouch may be a single, double, or multi-burst pouch having one or more compartments therein, wherein each of the one or more compartments may contain an oral cleaning fluid or solution.

Referring generally to the figures, an oral care tool may include a first lumen and a second lumen fluidly coupled to a brush head, according to various embodiment. The first lumen (alternately, a suction lumen) may be configured to enable suction of fluid from within an oral cavity and route the suctioned fluid through the oral care device and away from the oral cavity. The second lumen (alternately, a fluid lumen) may be configured to provide a fluid (e.g., cleaning solution, cleansing gel, etc.), flowing in a direction opposite fluid flowing within the first lumen, to an oral care site within the oral cavity. A terminal end of each of the first and second lumen may be fluidly coupled to a brush head, which is positioned at a distal end of the oral care tool.

In various embodiments, the first lumen may be fluidly coupled to one or more suction devices to facilitate removal of fluid from the oral cavity. In various embodiments, the first lumen may be formed by a single, continuous piece. In other embodiments, the first lumen may comprise one or more contiguous pieces. In various embodiments, the first lumen and the second lumen are formed separately. In other embodiments, the first and second lumen may be formed as a single piece.

In various embodiments, the second lumen may be fluidly coupled to a fluid reservoir, wherein the fluid reservoir may contain a cleaning solution or gel, which may be used to clean anatomy within the oral cavity. In various embodiments, the fluid reservoir may be coupled to the first and second lumen via a cap portion, wherein the cap portion includes an interior region configured to receive and be coupled to the fluid reservoir. In various embodiments, the fluid reservoir may be a tube or a vial. Manipulation of the fluid reservoir (e.g., squeezing, twisting, pressing, tilting, etc.) may cause the contained fluid to pass through the second lumen to the brush head, wherein it may be used to aid in cleansing and/or debridement. In various embodiments, the first lumen may include a flex portion, wherein the flex portion may have a higher elasticity in comparison to adjacent portions of the first lumen, and wherein the flex portion enables movement of the brush head relative to the first lumen.

In various embodiments, the brush head may include a brush head stem, which is mechanically and fluidly coupled to the first and second lumen. In various embodiments, the brush head may include one or more bristle sections and one or more foam sections, which are coupled to a brush head stem. In various embodiments, the bristle sections may be fixed to an interior region within the brush head stem and extend to an exterior region of the brush head stem through a plurality of apertures disposed therein. In various embodiments, the foam sections may be affixed (e.g., via an adhesive) to one or more exterior surfaces of the brush head stem, wherein the foam sections may be placed adjacent to bristle sections. In various embodiments, the foam sections may be alternately placed among the bristle sections. In various embodiments, the foam sections may be superimposed with the bristle sections such that the bristles extend through the foam section. In various embodiments, the brush head may have a hexagonal shape. In other embodiments, the brush head may have a two-sided configuration.

Referring now to FIGS. 1 and 2, a side and bottom view, respectively, of an oral care tool 100 is shown in accordance with an exemplary embodiment. As shown, the oral care tool 100 includes a handle portion 105, a cap portion 110, a brush head 115, and a stem portion 120. The handle portion 105, which may include adjacent cap portion 110, is configured to enable a user (e.g., medical personnel) to grasp the oral care tool 100. The handle portion 105 is fluidly coupled to a stem portion 120, which is further coupled to a brush head 115. The brush head 115 is configured to fit within an oral cavity to facilitate cleaning of oral anatomy. The handle portion may be coupled, at an end opposite the stem portion 120 and brush head 115, to one or more fluid flow devices (e.g., suction device, fluid vacuum, etc.) to enable routing of fluid through the oral care tool 100 and away from the oral cavity. The handle portion 105 is formed by a first lumen 125 and the cap portion 110, which enable a user (e.g., medical personnel) to grasp the oral care tool 100.

Figure 4:
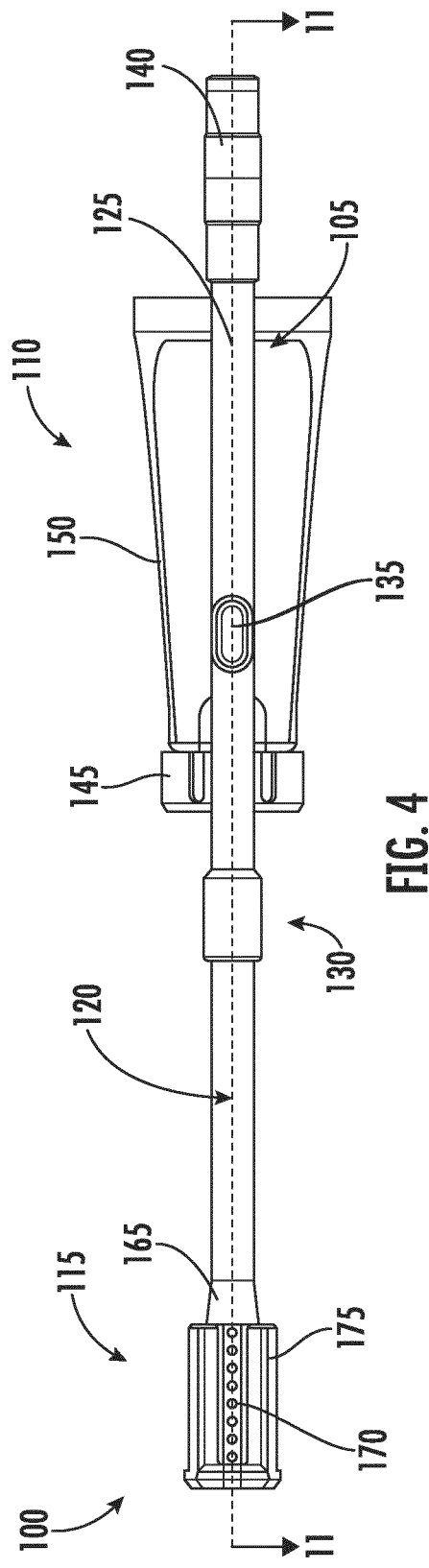
FIG. 4 shows a bottom view of the oral care tool of FIG. 3, according to an exemplary embodiment.

FIGS. 3 and 4 show alternative side and bottom views of oral care tool 100, according to an exemplary embodiment. As shown, the handle portion 105 includes a first lumen 125 and is adjacent to the cap portion 110. A terminal end of the first lumen 125 may include a fluid connector 140, which enables fluid coupling of the handle portion 105 to one or more fluid processing devices (e.g., suction device, fluid vacuum, etc.). The first lumen 125 also includes a port 135 (e.g., thumb port), wherein the port 135 is disposed on a side of the first lumen 125 that is opposite the cap portion 110. In various embodiments, the port 135 may be coupled to a closed suction system (e.g., swivel elbow closed suction system) to facilitate suction of fluid through the oral care tool 100.

In various embodiments, the cap portion 110 may be coupled to a top side of the first lumen 125. As shown in FIGS. 3 and 4, the cap portion 110 includes an integrally coupled cap 145, which is configured to receive an end of a fluid reservoir 150. In various embodiments, the fluid reservoir 150 may be a tube or vial containing a cleaning solution to aid in cleaning of oral anatomy. In various embodiments, the fluid reservoir 150 may be coupled to the cap 145 via a threaded or press-fit connection. A second lumen 155 may be in fluid communication with the fluid reservoir 150 via a fluid coupling within the cap 145. As shown, the second lumen 155 is configured to facilitate flow of fluid from the fluid reservoir 150 to the brush head 115. Fluid received at the brush head 115 may be dispersed within the oral cavity to aid in cleaning of oral anatomy. The second lumen 155 is configured to be disposed in a substantially parallel position relative to the first lumen along a length of the stem portion 120. The second lumen 155 may be coupled to first lumen 125 via a clip 160, which is integrally coupled to a middle portion 130. In various embodiments, the first lumen 125 may consist of two individual portions, which may be joined at the middle portion 130 (e.g., via one or more fluid connectors). In various embodiments, the first lumen 125 and the second lumen 155 may be separate elements of the oral care tool 100 (as shown). In other embodiments, the first lumen 125 and the second lumen 155 may be integrally formed within a single piece, such as within the body of the handle portion 105 and stem portion 120.

As shown, the stem portion 120 extends from the middle portion 130 to the brush head 115. The brush head 115 includes a brush head stem 165, to which bristles 170 and foam 175 may be fixed. In various embodiments, the bristles 170 may facilitate debridement of surfaces within the oral cavity (e.g., dental plaque removal) and the foam 175 may absorb fluid provided by the fluid reservoir 150 via the second lumen 155. In various embodiments, the bristles 170 may be fixed to an interior region of the brush head stem 165 and protrude through one or more apertures or orifices to an exterior region of the brush head stem 165. As shown, foam 175 may be affixed to one or more exterior surfaces of the brush head stem 165 and in one or more locations adjacent to bristles 170. FIGS. 3 and 4 show foam 175 having a substantially smooth topography; however, in various embodiments, the foam 175 may have varied topography (e.g., peaks, valleys, contours, etc.) to facilitate cleaning oral anatomy.

FIGS. 5-7 show alternate views of the cap portion 110, according various exemplary embodiments. FIG. 5 shows a side perspective view of the cap portion 110, which illustrates how cap portion 110 is arranged relative to the first lumen 125 within the oral care tool 100. As shown, the cap 145 is coupled to a top surface of the first lumen 125. In various embodiments, the cap 145 may be integrally formed with the top surface of the first lumen 125. In other embodiments, the cap 145 may be removably attached to the top surface of the first lumen 125 (e.g., via a clip, hook, fastener, etc.).

As shown in FIGS. 5 and 6, the second lumen 155 is fluidly coupled to the cap 145 at a port 180, which extends through the cap 145 to enable the second lumen 155 to be fluidly coupled to the fluid reservoir 150. FIG. 7 shows a side cross-sectional view of the cap portion 110 taken along line 11 (as shown in FIG. 4). As illustrated, the cap 145 may include a cuspate portion 185, which is received within the fluid reservoir 150. In various embodiments, the cuspate portion 185 may be substantially cylindrical in shape so as to fit within an opening of the fluid reservoir 150. In some embodiments, the cuspate portion 185 may have a circumference of sufficient magnitude such that an outer circumferential surface of the cuspate portion 185 may interface with an inner circumferential surface of the opening of the fluid reservoir 150. In other embodiments, the cuspate portion 185 may have a circumference that is substantially smaller than a circumference of the fluid reservoir 150 opening. In various embodiments, the fluid reservoir 150 may include a seal or membrane positioned across an opening of the fluid reservoir 150 to prevent fluid from unduly flowing out of the fluid reservoir 150. An end of the cuspate portion 185 may include a cusp 187 (e.g., point, edge, needle, etc.), which is configured to puncture the seal or membrane of the fluid reservoir 150 upon coupling of the fluid reservoir 150 to the cap 145. To prevent leakage of fluid from the fluid reservoir 150 after coupling to the cap 145, a seal 190 (e.g., o-ring) may be disposed within the cap 145 at the coupling interface between the cap 145 and the fluid reservoir 150. In various embodiments, fluid reservoir 150 may be comprised of an elastically deformable material (e.g., polymer, aluminum, etc.) and may accordingly force fluid from within the fluid reservoir 150 to flow out when a threshold force is applied to an outer surface of the fluid reservoir 150.

FIGS. 8 and 9 show alternate side views of an oral care tool 100 having a snap-type cap 145 within the cap portion 110, according to an exemplary embodiment. As shown, cap 145 may be coupled to the first lumen 125 via clip 196. The cap 145 may also include a plurality of flexible tabs 195, which may elastically deflect in response to an applied press-fit force. In various embodiments, each of the flexible tabs 195 may include a protruding feature along an inner surface of the tabs 195, which facilitate coupling of the cap 145 to the fluid reservoir 150. In various embodiments, the fluid reservoir may include protruding features along an outer surface of its opening that complement the protruding features of tabs 195. Accordingly, in various embodiments, when the fluid reservoir 150 is fit within an inner region of the cap 145, each of flexible tabs 195 displace outward and snap-fit to the fluid reservoir 150 via the complimentary protruding features on both the fluid reservoir 150 opening and on each flexible tab 195. In various embodiments, an inner circumference of the cap 145 may be the same as or smaller than an outer circumference of the fluid reservoir 150. Accordingly, when the fluid reservoir 150 is fit within the inner region of the cap 145, each of the flexible tabs 195 may elastically expand outward around the opening of the fluid reservoir 150. The fluid reservoir 150 may thus be held in place within the cap 145 via the protruding features of the flexible tabs 195 and a force exerted on the fluid reservoir 150 generated by the flexible tabs 195. FIG. 8 shows a side view of oral care tool 100 having a snap-type cap 145. As shown in FIG. 9, each flexible tab 195 of the cap 145 may expand outward to receive and snap onto the opening of the fluid reservoir 150 (via complementary protruding features). In various embodiments, the protruding features on each of the flexible tabs 195 and/or the fluid reservoir 150 opening may be ridges, threads, grooves, etc.

Figure 11:
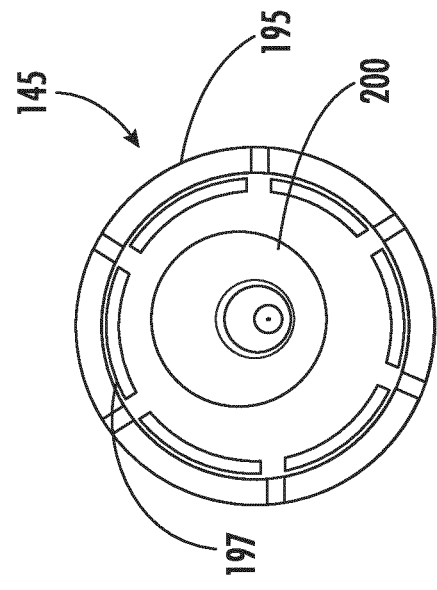
FIGS. 10-13 show alternate views of a snap-type cap portion of the oral care tool of FIG. 8, according to an exemplary embodiment.
Figure 13:
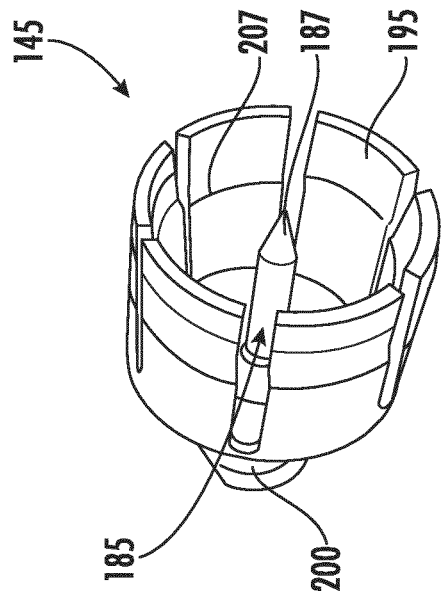
Figure 10:
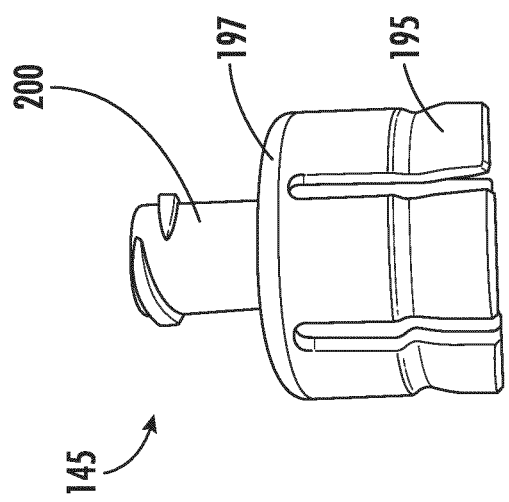
Figure 12:

FIGS. 10-13 show alternate views of a snap-type cap 145, according to an exemplary embodiment. FIGS. 10 and 11 show side perspective and top views of the cap 145, illustrating a circumferential configuration of flexible tabs 195 relative to an end portion 197, wherein the region formed by an inner surface of the end portion 197 and the inner surfaces of the flexible tabs 195 are configured to receive the opening of the fluid reservoir 150. As shown, the cap 145 may also include a knob 200, which is integrally formed within an upper surface of the end portion 197 and facilitates coupling of the cap 145 to the first lumen 125. In various embodiments, the knob 200 may be received within clip 196, which is mounted to or integrally formed within a top portion of the first lumen 125. FIGS. 12 and 13 show side and end perspective views, respectively, according to an exemplary embodiment. As shown, the cap 145 includes a cuspate portion 185 having a cusp 187 formed in a needle-like shape, wherein the cusp 187 is configured to puncture a seal of a fluid reservoir 150. In addition, FIG. 13 illustrates protruding features 207, which are integrally formed along an inner surface of each of the flexible tabs 195, which enable coupling of the fluid reservoir 150 to the cap 145.

During operation of the oral care tool 100, a sealed fluid reservoir 150 may be coupled to the cap 145 (e.g., via a press-fit, snap-fit, and/or threaded coupling) and inserted within an oral cavity. Upon coupling, cuspate portion 185 may puncture the seal of the fluid reservoir 150. A force may subsequently applied to the fluid reservoir 150 such that fluid (e.g., oral cleaning solution) may flow through the second lumen 155 and into the brush head 115. At the brush head, 115, foam 175 that is fixed to the brush head stem 165 may absorb fluid flowing from the second lumen. Accordingly, when the brush head 115 is pressed on and moved along surfaces within the oral cavity, fluid absorbed by the foam 175 may be released and subsequently spread and circulated within the oral cavity by bristles 170. To prevent excess fluid from accumulating within the oral cavity, an opening within the brush head 115, which is fluidly coupled to the first lumen 125, may suction fluid from the oral cavity and route the suctioned fluid through the first lumen 125. Fluid within the first lumen 125 may be suctioned away from the oral care tool 100 via a liquid vacuum or other suction device and collected within a separate receptacle.

Once fluid from the fluid reservoir 150 has been dispersed within the oral cavity, the oral care tool 100 must maneuver within the oral cavity to sufficiently spread dispersed fluid and clean surfaces of oral anatomy. Accordingly, the brush head 115 may be configured to enable maneuverability within the oral cavity and have a foam 175 and bristle 170 arrangement that facilitates surface cleaning and debridement.

FIGS. 14-17 show alternate views of a hexagonally shaped brush head 115, according to an exemplary embodiment. As shown, the brush head 115 may include a hexagonally shaped brush head stem 165 (i.e., an axial/transverse cross-section of the brush head stem 165 is shaped as a hexagon) and is axially symmetric. As the hexagonal brush head 115 is axially symmetric, the oral care tool 100 may be inserted into an oral cavity with any degree of axial rotation (i.e., turned along its long axis) and facilitate uniform and consistent cleaning of surfaces within the oral cavity without requiring repositioning and/or reinsertion. Each face of the hexagonally shaped brush head stem 165 may have, affixed or coupled thereto, a section of foam 175 or a section of bristles 170 extending longitudinally along the brush head stem 165. As illustrated, each section of foam 175 is alternately positioned with each section of bristles 170. In various embodiments, the brush head stem 165 may additionally have a section of foam 175 affixed or coupled to a terminal end of the brush head stem 165. In various embodiments, each section of foam 175 may be separately affixed or coupled to the brush head stem 165. In other embodiments, each of the foam 175 sections may form a continuous foam 175 piece that may be affixed or coupled to the brush head stem 165.

As shown, the brush head 115 is fluidly coupled to the second lumen 155, which terminates at the brush head stem 165 and delivers fluid from the fluid reservoir 150. Foam 175 and bristles 170 sections may accordingly absorb and distribute the fluid within the oral cavity to facilitate cleaning of oral anatomy surfaces therein. In addition, the brush head stem 165 may include a aperture 208 disposed therein, which is fluidly coupled to the first lumen 125 and enables fluid dispersed within the oral cavity to be suctioned into and through the first lumen 125 for removal from the oral cavity.

FIGS. 18-20 show alternate views of a hexagonally shaped brush head stem 165, according to various exemplary embodiments. FIG. 18 shows an end view of the hexagonally shaped brush head stem 165, wherein the brush head stem 165 may have a first set of faces 210 and a second set of faces 215, which are configured to receive or interface with sections of bristles 170 and foam 175, respectively. The first set of faces 210 and the second set of faces 215 are disposed in an alternating arrangement within the brush head stem 165. FIGS. 19 and 20 show alternate side perspective views of the hexagonal brush head stem 165. As shown, each of the faces 210 may include a plurality of apertures 220, each of which is configured to receive bristles 170 therein. Correspondingly, each of the faces 215 have a substantially smooth surface to which foam 175 may be affixed (e.g., via adhesive). In various embodiments, the aperture 208 may extend transversely through the brush head stem 165 to facilitate suction of fluid from within the oral cavity. Although FIGS. 14-20 show aperture 208 as being substantially ellipsoidal in shape, aperture 208 may be circular or polygonal, according to various embodiments.

Figure 21:
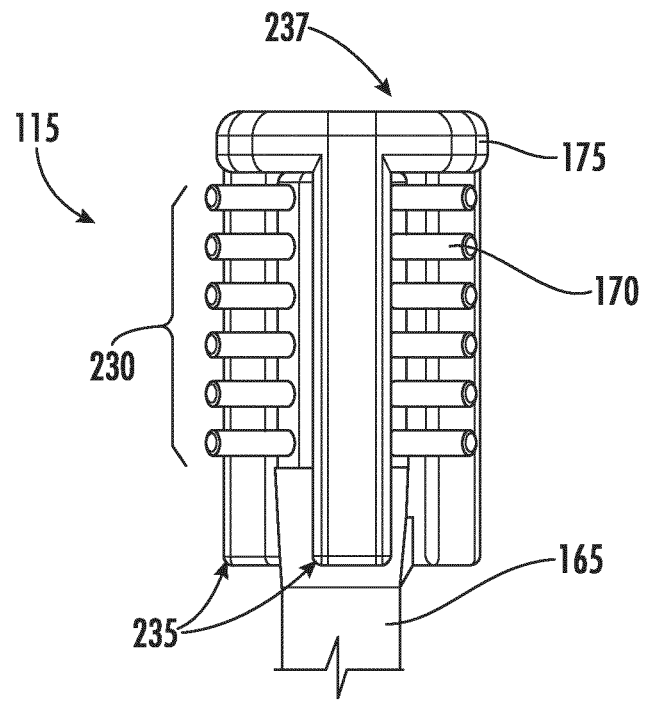
FIGS. 21-22 show alternate views of a hexagonal brush head having the brush head stem of FIGS. 18-20, according to an exemplary embodiment.
Figure 22:
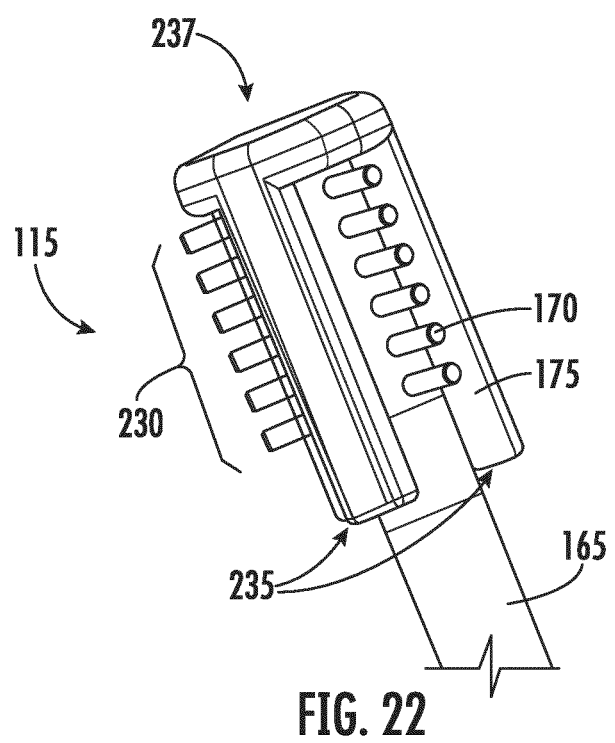

FIGS. 21 and 22 show side and perspective views, respectively of a brush head 115 having the hexagonally shaped brush head stem 165 of FIGS. 18-20, according to various exemplary embodiments. As shown, brush head 115 may include bristles 170 and foam 175 alternately affixed or coupled to faces (e.g., faces 210 and 215) of the brush head stem 165. The bristles 170 may be affixed to the brush head stem 165 (e.g., via the apertures 220 on faces 210) within bristle sections 230, which may be arranged as longitudinal strips 235. Similarly, the foam 175 may be affixed to the brush stem 165 (e.g., to faces 215) in longitudinal strips 235. As shown, the brush head stem 165 may also include an end piece 237 of foam 175, which is positioned in a substantially perpendicular orientation relative to longitudinal strips 235. In various embodiments, longitudinal strips 235 and end piece 237 may be individual pieces of foam 175 that are separately affixed to the brush head stem 165. In other embodiments, the strips 235 and the end piece 237 may form a continuous piece affixed to the brush head stem 165. In various embodiments, strips 235 and bristle sections 230 may be twisted along the brush head stem, forming a helical arrangement.

Figure 23:
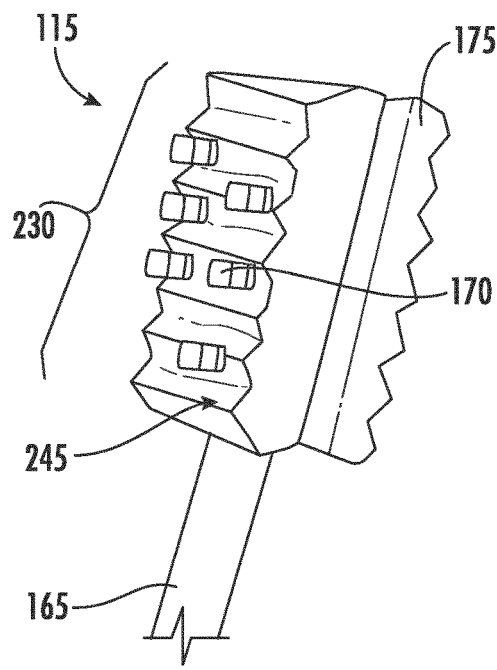
FIG. 23 shows a perspective view of a two-sided brush head for an oral care tool, according to an exemplary embodiment.
Figure 24:
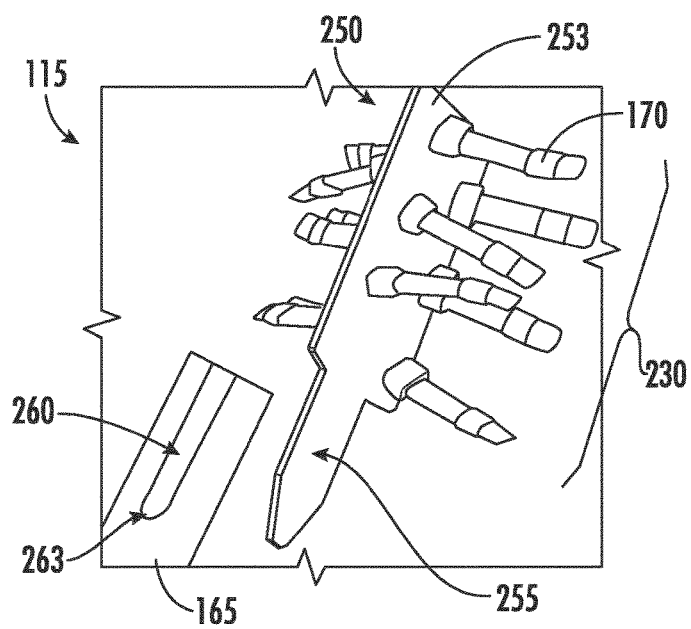
FIG. 24 shows a perspective view of a bristles section and brush head stem for the two-sided brush head of FIG. 23, according to an exemplary embodiment.

FIGS. 23 and 24 show alternate views of a two-sided brush head 115, according to various exemplary embodiments. As shown, the brush head 115 may have a substantially rectangular shape with superimposed bristles 170 and foam 175 affixed to two opposite sides of brush head stem 165. As the two-sided brush head 115 has a substantially small transverse thickness, the oral care tool 100 may be inserted into correspondingly small space within an oral cavity (e.g., a space between an oral cavity wall and teeth) to facilitate uniform and consistent cleaning of surfaces within the oral cavity without requiring repositioning and/or reinsertion. FIG. 23 shows a side perspective view of the two-sided brush head 115. As shown, the two-sided brush head 115 may have bristle sections 230 configured as longitudinal strips 235, which include bristles 170 superimposed or mounted adjacent to thin (i.e., having a thickness is less than $1/10^{th}$ of a corresponding length), rectangular foam sections 245 (i.e., sections of foam 175) on opposing sides of a brush head stem 165.

FIG. 24 shows a side perspective view of a two-sided brush head 165 with foam sections 245 removed. As shown, the brush head stem 165 may have a slot 260 disposed within a terminal end of the brush head stem 165. The slot 260 may be configured to receive a fitted end 255 of a bristle mount 250. The bristle mount 250 may include a plurality of apertures 253 disposed there through, which are configured to receive and affix bristles 170 arranged in longitudinally disposed bristle sections 230 within the brush head 115. In various embodiments, the fitted end 255 may be received within the slot 260 to form a flexible coupling with the brush head stem 165. Accordingly, an end of the bristle mount 250 opposite the fitted end 255 may be displaced (e.g., rotated, bent, flexed, etc.) relative to the brush head stem 165 to enable the oral care tool 100 to easily maneuver within the oral cavity. In addition, the brush head stem 165 may include a transverse aperture 263 positioned below the slot 260 and which may enable suctioning of fluid from within the oral cavity.

Figure 25:
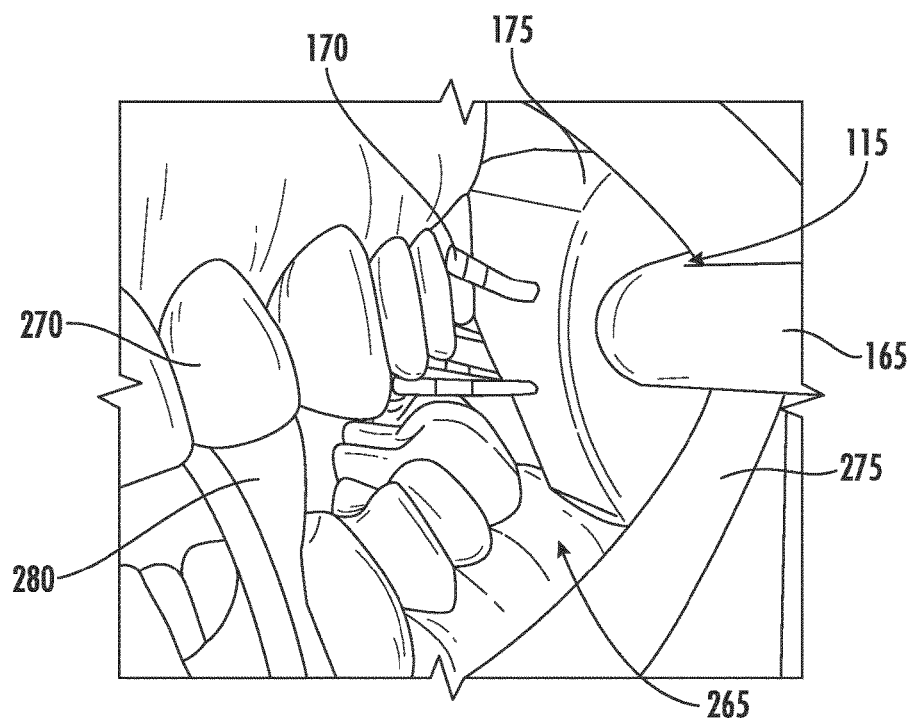
FIG. 25 shows a perspective view of an oral care tool having a two-sided brush head within an oral cavity, according to an exemplary embodiment.

FIG. 25 shows a perspective view of an oral care tool 100 having a two-sided brush head 115 positioned within an oral cavity 265, according to an exemplary embodiment. As shown, the two-sided brush head 115 configuration may enable placement of the oral care tool 100 between spaces formed between an oral cavity wall 275 and oral anatomy 270 (e.g., teeth), which may be narrowed or impeded from placement of one or more medical devices 280 (e.g., ventilator) within the oral cavity 265.

Figure 28:
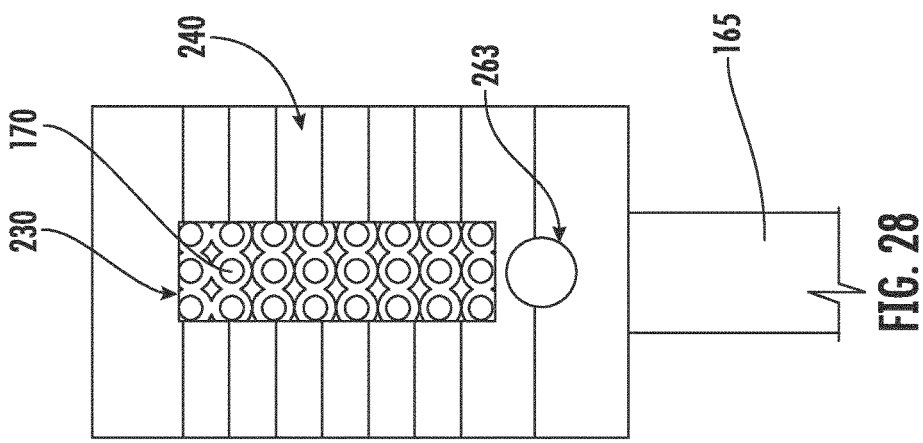
FIGS. 27-28 show alternate views of a two-sided brush head for an oral care tool, according to an exemplary embodiment.
Figure 27:
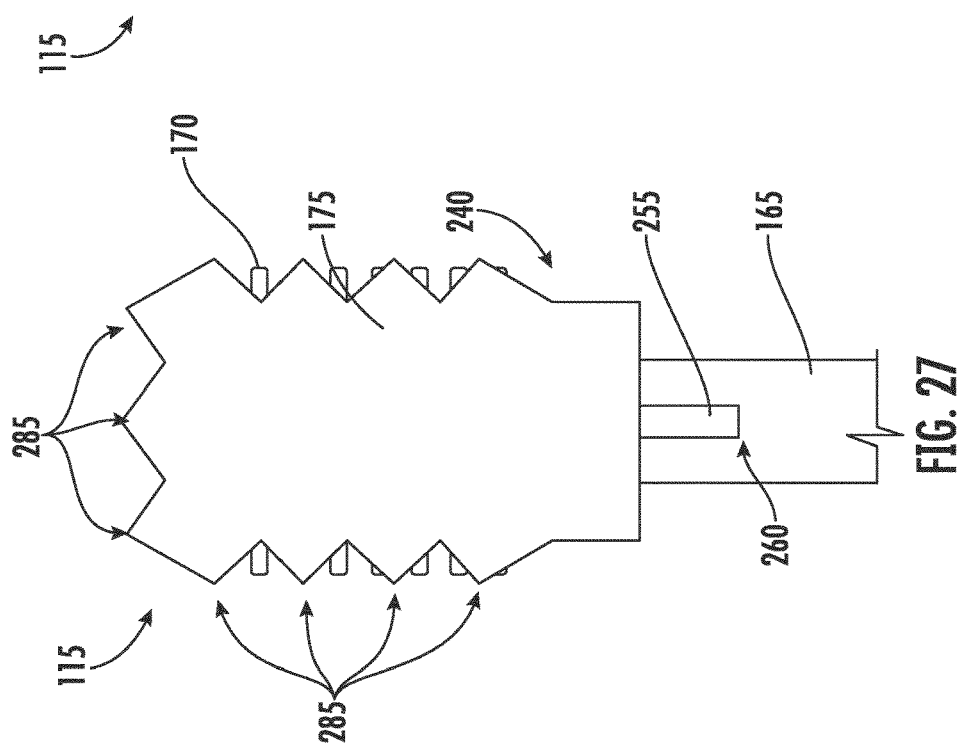
Figure 26:
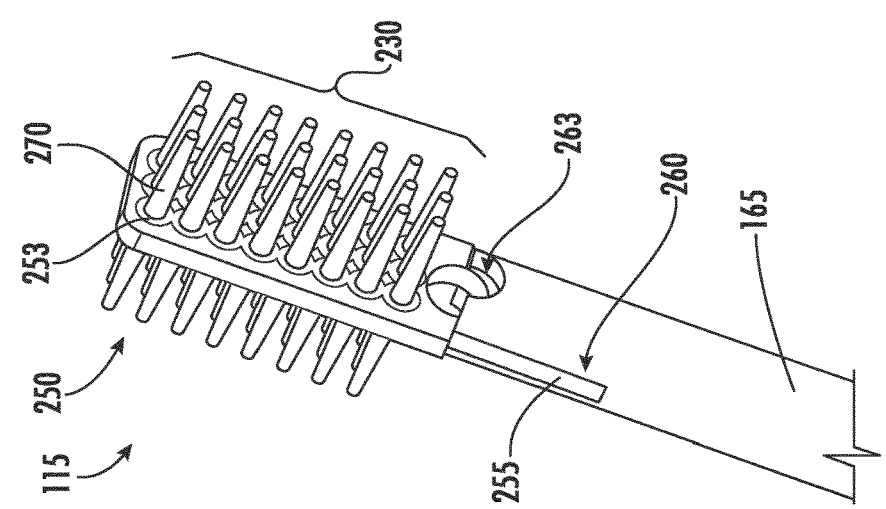
FIG. 26 shows a perspective view of a brush head stem and a bristles section for a two-sided brush head of an oral care tool, according to an exemplary embodiment.

FIGS. 26-28 show alternate views of a two-sided brush head 115, according to various exemplary embodiments. FIG. 26 shows a side perspective view of a two-sided brush head 115 with affixed foam 175 removed. As shown, the two-sided brush head 115 includes a bristle mount 250, which has bristles 170 affixed in bristle sections 230 (arranged within the longitudinal strips 235) via apertures 253. The bristle mount 250 has a fitted end 255, which is configured to fit within slot 260 formed within the brush head stem 165. As shown, aperture 263 may be formed transversely through the bristle mount 250 and the brush head stem 165 within top portion of the aperture 263 to facilitate suctioning of fluid within the oral cavity. As previously described, the fitted end 255 may form a flexible coupling with the brush head stem 165 (via the slot 260). Accordingly, an end of the bristle mount 250 opposite the fitted end 255 may be displaced (e.g., rotated, bent, flexed, etc.) relative to the brush head stem 165 to enable the oral care tool 100 to easily maneuver within the oral cavity.

FIGS. 27 and 28 show alternate side views of a two-sided brush head 115, according to various exemplary embodiments. As shown, the brush head 115 may include bristles 170 affixed to bristle mount 250, which is coupled to the brush head stem 165. In addition, thin, rectangular sections 240 of foam 175 may be superimposed or mounted adjacent to the bristles 170. In various embodiments, the sections 240 of foam 175 may be separately affixed or coupled to sides of the bristle mount 250 and/or brush head stem 165. In other embodiments, each of the foam 175 sections 240 may form a continuous piece of foam 175 that may be affixed or coupled to the bristle mount 250 and/or brush head stem 165. In various embodiments, the bristles 170 may be mounted within a substantially central portion of the bristle mount 250 and sections 240 of foam 175 may be affixed along a perimeter of the bristles 170. In various embodiments, the bristles 170 and foam 175 sections 240 may be superimposed. As shown in FIGS. 27 and 28, sections 240 may be formed to have variable topography to facilitate cleaning of surfaces within the oral cavity. As shown, the sections 240 of foam 175 may include a plurality of peaks and valleys 285 to form a substantially ridged surface.

Figure 29:
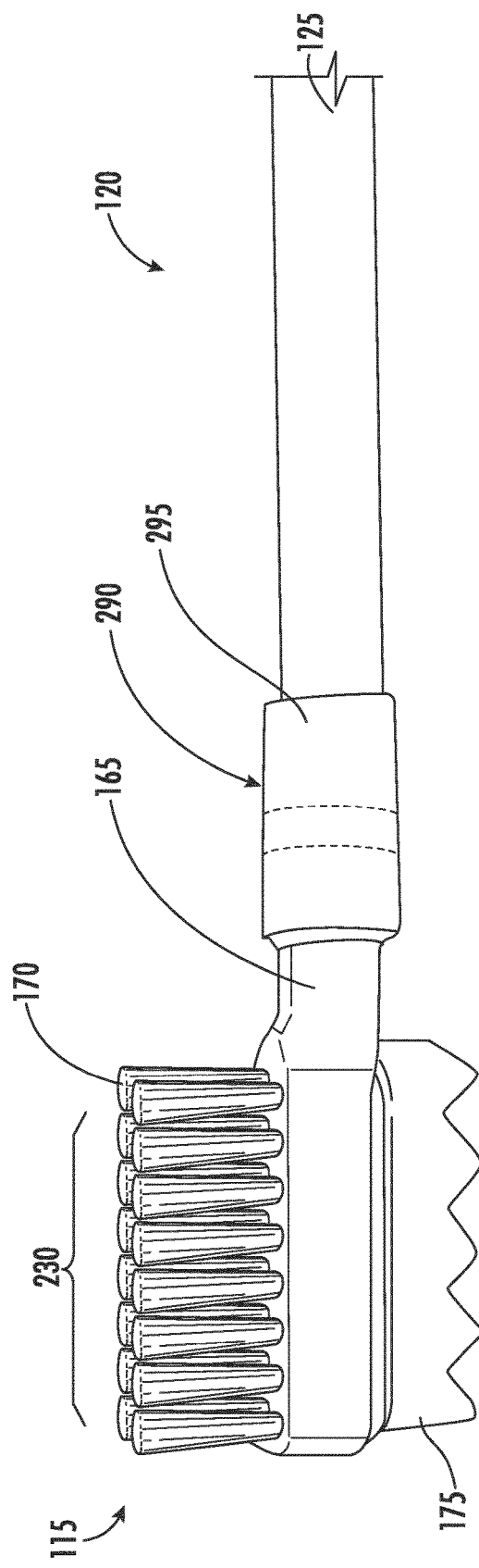
FIG. 29 shows a side view of an oral care tool near a flex portion, wherein the brush head is in a neutral position, according to an exemplary embodiment.
Figure 30:
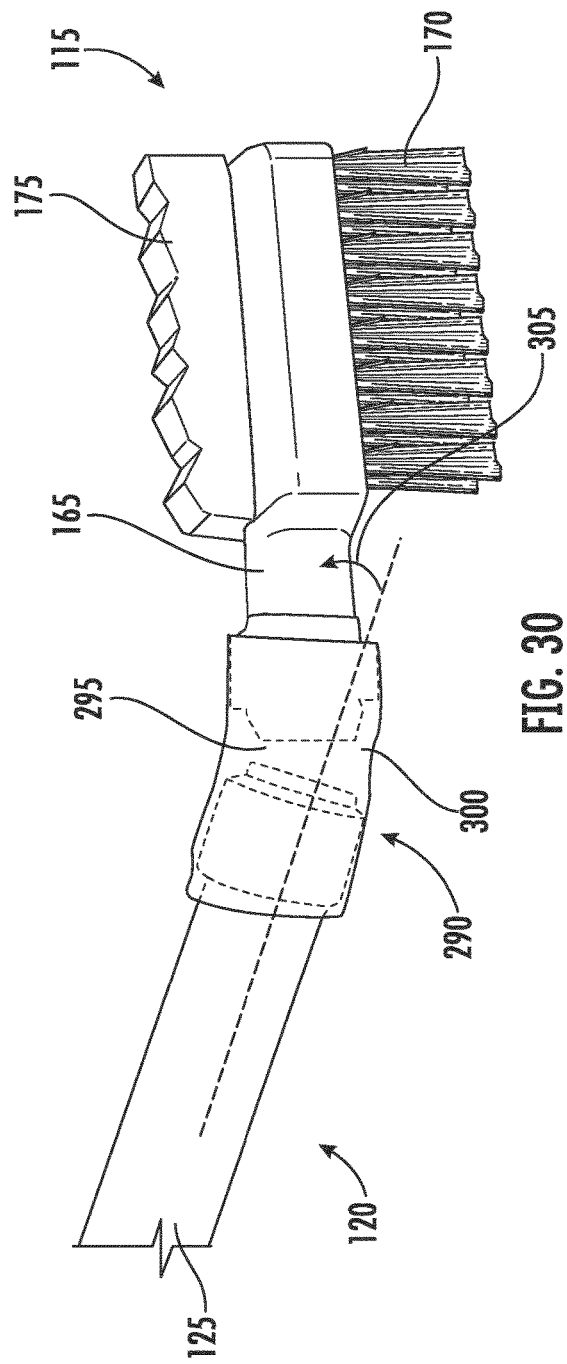
FIG. 30 shows a side view of the oral care tool of FIG. 29, wherein the brush head is in a flexed position, according to an exemplary embodiment.

FIGS. 29-30 show alternate side views of an oral care tool 100 having a flex portion 290 disposed between the brush head stem 165 and the stem portion 120, according to various exemplary embodiments. The flex portion 290 may enable the oral care tool 100 to maneuver through an oral cavity and adjust to varying spaces and oral anatomy therein. As shown, the oral care tool 100 may include a first lumen 125 having stem portion 120 fluidly coupled to a brush head stem 165, wherein the brush head stem 165 includes bristles 170 and foam 175 affixed thereto. FIG. 29 shows a side view of oral care tool 100 having a flex portion 290 disposed between the brush head 115 and the stem portion 120. As shown, the flex portion 290 may include a flexible coupling 295 that enables fluid flow from within the stem portion 120 of the first lumen 125 to the brush head stem 165. As shown in FIG. 30, the flex portion 290 may enable the brush head 115 to flex (e.g., rotate, bend, displace, etc.) relative to a longitudinal axis 300 of the stem portion 120. FIG. 30 shows the brush head 115 flexed a distance 305 from the axis 300 of the stem portion 120. FIGS. 29 and 30 show flex portion 290 having a flexible coupling 295, which conjoins the separately disposed stem portion 120 and brush head 115. In various other embodiments, the stem portion 120 and the brush head 115 may form a continuous piece and flex portion 290 may be a localized region therein having increased deformability relative to the brush head 115 and the stem portion 120. In such embodiments, the flex portion 290 may comprise a region having a smaller circumference compared to either the stem portion 120 or the brush head 115. In other various embodiments, flex portion 290 may comprise one or more materials contiguously disposed materials between the stem portion 120 and the brush head 115 with varied mechanical properties.

FIG. 31 shows a side view of an oral care tool 400, according to an exemplary embodiment. As shown, the oral care tool 400 includes a handle portion 405, which is coupled to a brush head 415 via a stem portion 420, which is disposed therebetween. As shown, the handle portion 405 includes one or more grip features 407, which are configured to facilitate gripping or handling of the oral care tool 400 (e.g., by a medical practitioner). The grip features 407 may include one or more radially extending ribs 417, which may have varying radii. In various embodiments, the radii of the ribs 417 may be configured to mimic a hand shape or may be configured to conform to a hand (e.g., of a medical practitioner). As illustrated, the stem portion 420 includes a lumen 425, which is fluidly coupled to the handle portion 405 at a middle portion 430. In various embodiments, the lumen 425 is configured to be partially disposed within the handle portion 405 at the middle portion 430 (e.g., press fit). The handle portion 405 may further include a port 435 (e.g., thumb port), which is fluidly coupled to the lumen 425 and is configured to enable suction of fluid through the oral care tool 400. In various embodiments, a fluid connection portion 440 within the handle portion 405 may be fluidly coupled to one or more fluid processing devices (e.g., suction device, fluid vacuum, etc.). Accordingly, the port 435 (e.g., thumb port) may be coupled to a closed suction system (e.g., swivel elbow closed suction system) to facilitate suction of fluid through the oral care tool 400.

As shown in FIG. 31, the brush head 415 portion of the oral care tool 400 may include a bristles section 470 and a foam section 475, wherein the bristles section 470 and the foam section 475 are circumferentially disposed about lumen 425 within the stem portion 420. As further illustrated in FIG. 32, which shows a perspective view of the oral care tool 400 near the brush head 415, each of the bristles section 470 and the foam section 475 are configured to extend radially outward from the lumen 425.

FIGS. 33-35 show perspective views of various bristle sections 470 for the brush head 415, according to various exemplary embodiments. As shown in each of FIGS. 33-35, the bristles section 470 may include a plurality bristles 480, which extend from a central shaft opening 477. In various embodiments, the shaft opening 477 may be configured to fit over, engage with, and/or be coupled to the lumen 425. In various embodiments, the bristles section 470 may include any number of bristles (e.g., 9 bristles as in FIG. 33, 11 bristles as in FIG. 34, 3 bristles as in FIG. 35, etc.). As shown, the bristles 480 may resemble cones with rounded tips. In various embodiments the bristles 480 may comprise one or more non-abrasive, flexible, and/or biocompatible materials. In various embodiments, the bristles 480 may comprise one or more polymers, rubbers, silicones, or any other flexible material suitable for use within an oral cavity. In various embodiments, the bristles section 470 may include a single ring of bristles 480, as illustrated in FIGS. 34 and 35. In various other embodiments, the bristles section 470 may include two rows of bristles 480, as illustrated in FIG. 33. In yet other embodiments, the bristles section 470 may include any number of rows of bristles 480. In various embodiments, each of the bristles 480 may have a varying or constant thickness.

Figure 36:
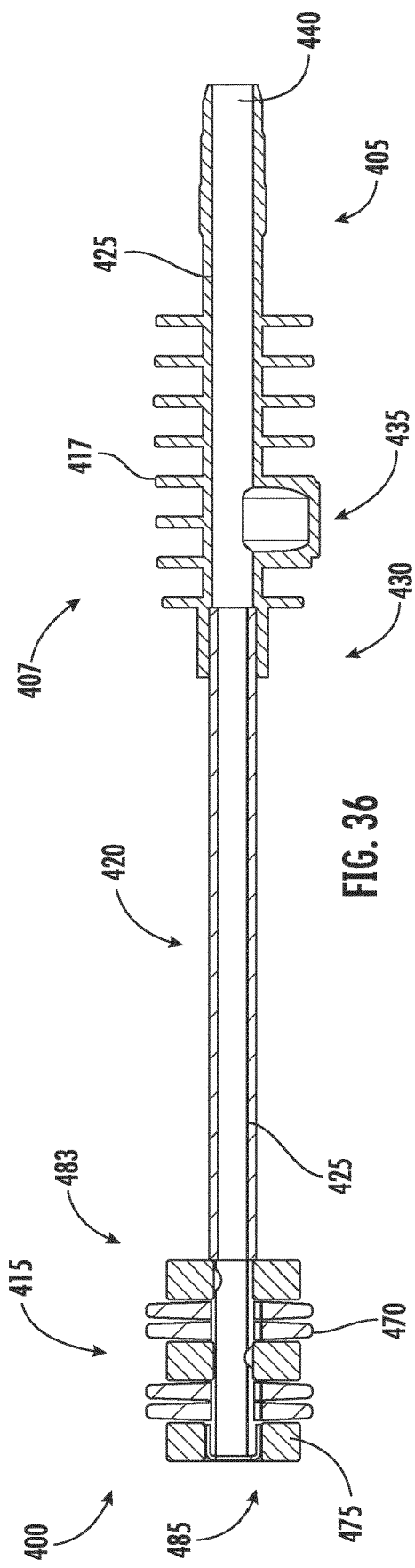
FIGS. 36-37 show side cross-sectional views of oral care tools having a layered brush head configuration, according to various exemplary embodiments.
Figure 37:
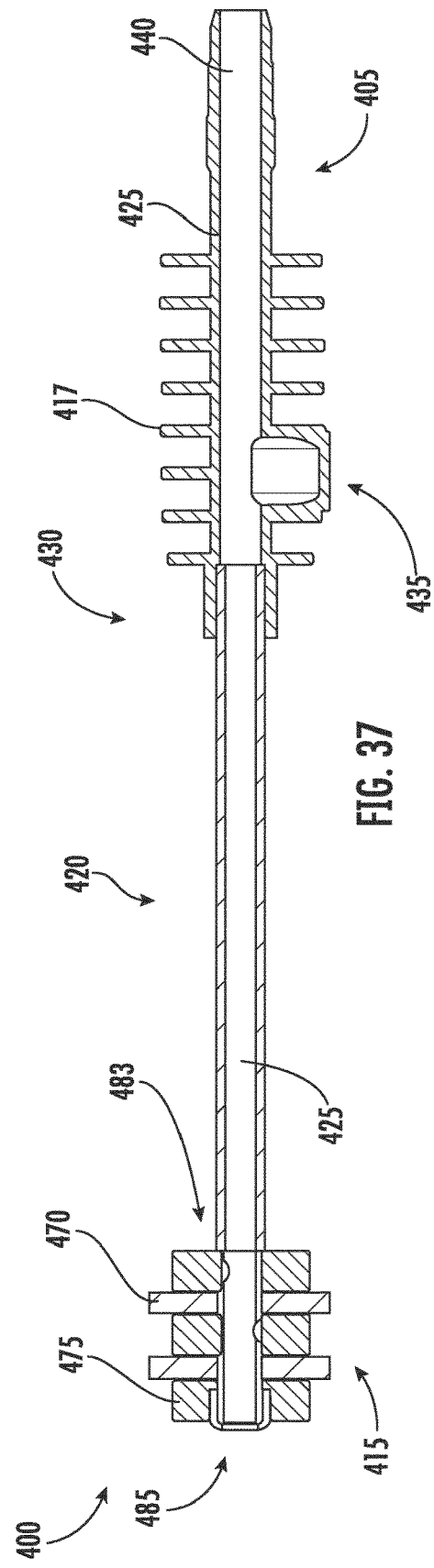

FIGS. 36 and 37 show side cross-sectional views of the oral care tool 400 having different configurations of bristles sections 470 and foam sections 475, according to various exemplary embodiments. As shown, the brush head 415 of the oral care tool 400 may include a plurality of bristles sections 470 and foam sections 475, the bristles sections 470 and foam sections 475 being layered along the long axis of the brush head 415 and the stem portion 420. In an embodiment, as illustrated in each of FIGS. 36 and 37, the brush head 415 may include three foam sections 475 separated by two bristles sections 470. The foam sections 475 and the bristles sections 470 may be disposed between a first end 483 and a second end 485 of the brush head 415. In various embodiments, the foam section 475 may have varied topography (e.g., peaks, valleys, contours, etc.) to facilitate cleaning oral anatomy. In various embodiments, each of the bristles 480 within each bristles section 470 may be oriented substantially perpendicular relative to the lumen 425 within the stem portion 420. In various embodiments, each of the bristles 480 may have a varied angular orientation relative to the lumen 425 within the stem portion 420. In various embodiments, the radius of each of the bristles sections 470 (defined by a length of the bristles 480) and the foam sections 475 may be the same or substantially similar. In various embodiments, the bristles sections 470 may have a greater radius compared to the foam sections 475 or vice versa. In various embodiments, the bristles sections 470 and/or the foam sections 475 may have a uniform radius. In other embodiments, the bristles sections 470 and/or the foam sections 475 may have a variable radius. As shown in FIG. 36, each of the bristles sections 470 may include two rows of bristles 480. Alternatively, each of the bristles sections 470 may include a single row of bristles 480, as illustrated in FIG. 37. In various embodiments, the bristles sections 470 may comprise both single rows and multiple rows of bristles 480. In various embodiments, the bristles sections 470 and/or the foam sections 475 may be configured to rotate or be fixed about the lumen 425 within the stem portion 420, or a combination thereof.

Figure 38:
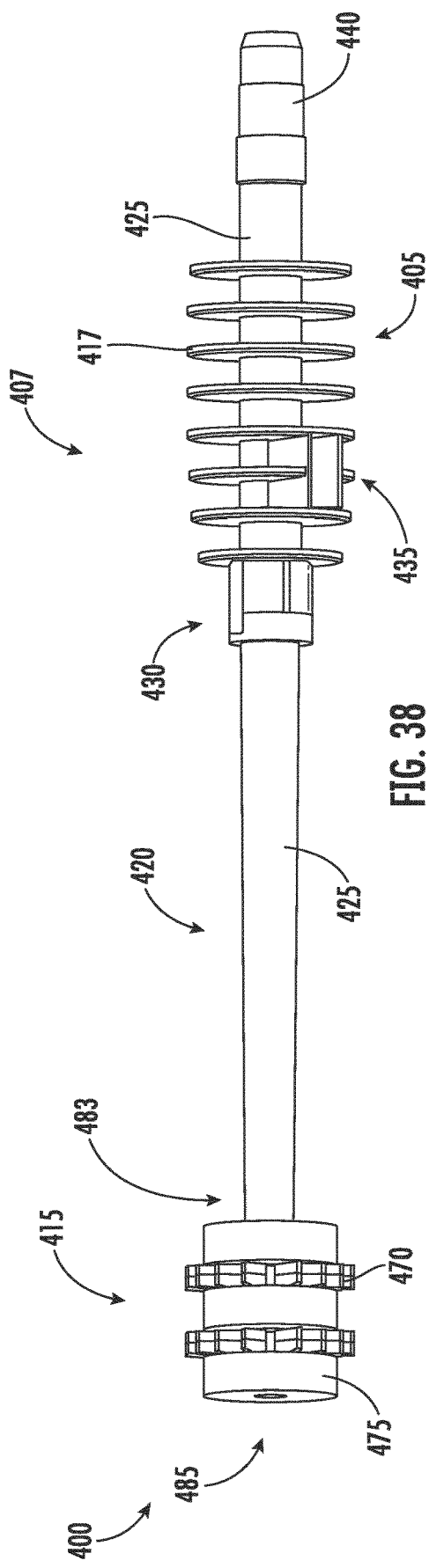
FIG. 38 shows a side view of an oral care tool having a layered brush head configuration, according to an exemplary embodiment.
Figure 40:
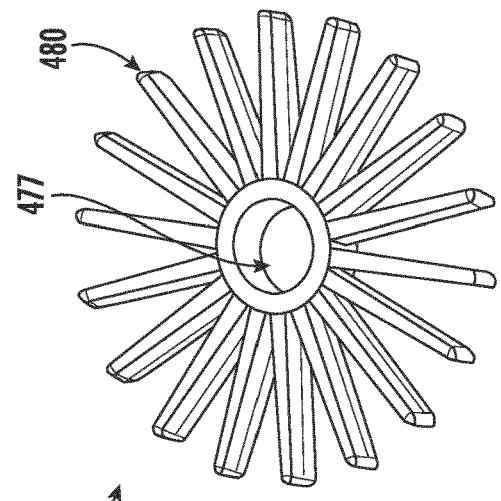
FIGS. 39-40 show alternate views of radially extending flat bristles, according to various exemplary embodiments.
Figure 39:
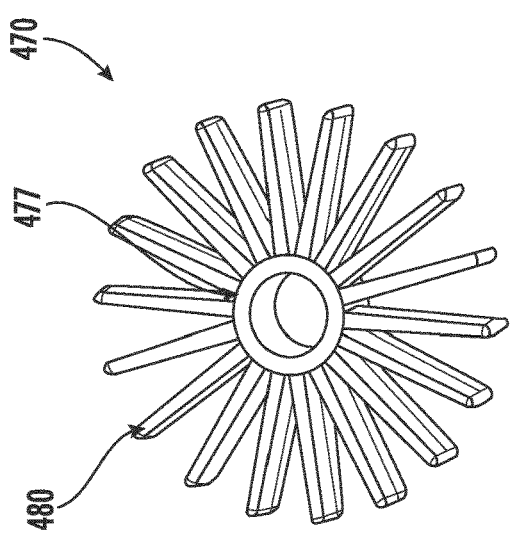

FIG. 38 shows a side view of the oral care tool 400, according to an exemplary embodiment. As shown, the oral care tool 400 may include non-conically shaped bristles 480 within one or more bristles sections 475 disposed within the brush head 415. As illustrated in FIGS. 39 and 40, the bristles sections 470 may include bristles 480 having a substantially flat profile. In various embodiments, each of the bristles 480 may have a substantially rectangular cross-section. In some embodiments, each of the bristles 480 may have a constant thickness. In other embodiments, each of the bristles 480 may have a varying or tapered thickness, such that the bristles 480 may have a somewhat triangular cross-section. Although FIGS. 39 and 40 show bristles sections 470 having 17 and 19 bristles 480, respectively, various embodiments of the bristles sections 470 may have any number of bristles 480.

In various embodiments, the oral care tool 400 may have any number of bristles sections 470 and foam sections 475. As shown in FIG. 41, which shows a side view of the oral care tool 400, the brush head 415 may have two bristles sections 470 and three foam sections 475. Alternatively, the brush head 415 may have one bristles section 470 disposed between two foam sections 475, as shown in FIG. 42, which shows another side view of the oral care tool 400. In various embodiments, each of the bristles sections 470 and/or each of the foam sections 475 may have the same or similar thicknesses. In various embodiments, each of the bristles sections 470 and/or each of the foam sections 475 may have different thicknesses. Although FIGS. 41 and 42 show the brush head 415 of the oral care tool 400 having bristles sections 470 disposed between foam sections 475, various embodiments of the oral care tool 400 may include a single bristles section 470 disposed adjacent a single foam section 475.

In various embodiments, the brush head 415 of the oral care tool 400 may include one or more bristles sections 470, wherein each bristles section 470 includes bristles 480 having the same or similar shape. In other embodiments, the bristles 480 within each of the bristles sections 470 may have one or more different shapes (e.g., conical, flat, rectangular, etc.). FIGS. 43-47 show side views of the brush head 415 of the oral care tool 400 having various configurations of bristles sections 470 and foam sections 475, according to various exemplary embodiments. As illustrated in FIG. 43, the brush head 415 may include a single bristles section 470 having four rows of flat bristles 480 disposed between two foam sections 475. Alternatively, the brush head 415 may include a single bristles section 470 having three rows of conical bristles 480 disposed between two foam sections 475, as illustrated in FIG. 44. In yet another embodiment, the brush head 415 may have two foam sections 475 sandwiching a single bristles section 470 having six rows of bristles 480, as shown in FIG. 45. As illustrated in FIG. 46, the brush head 415 may include alternating rows of conical and flat bristles 480 within a bristles section 470. Alternatively, or in addition, the brush head 415 may include a bristles section 470 having multiple rows of bristles 480, wherein a number of bristles 480 within each row is different, as shown in FIG. 47. In various embodiments, a diameter of at least one of bristles sections 470 is greater than a diameter of at least one of the foam sections 475. In other embodiments, a diameter of at least one of the bristles sections 470 is approximately the same as a diameter of at least one of the foam sections 475. In yet other embodiments, a diameter of at least one of the bristles sections 470 is less than a diameter of at least one of the foam sections 475. In various embodiments, an axial thickness of at least one of the bristles sections 475 is less than at least one of the foam sections 475. In other embodiments, an axial thickness of at least one of the bristles sections 470 is approximately the same as an axial thickness of at least one of the foam sections 475. In yet other embodiments, an axial thickness of at least one of the bristles sections 470 is less than an axial thickness of at least one of the foam sections 475.

Figure 48:
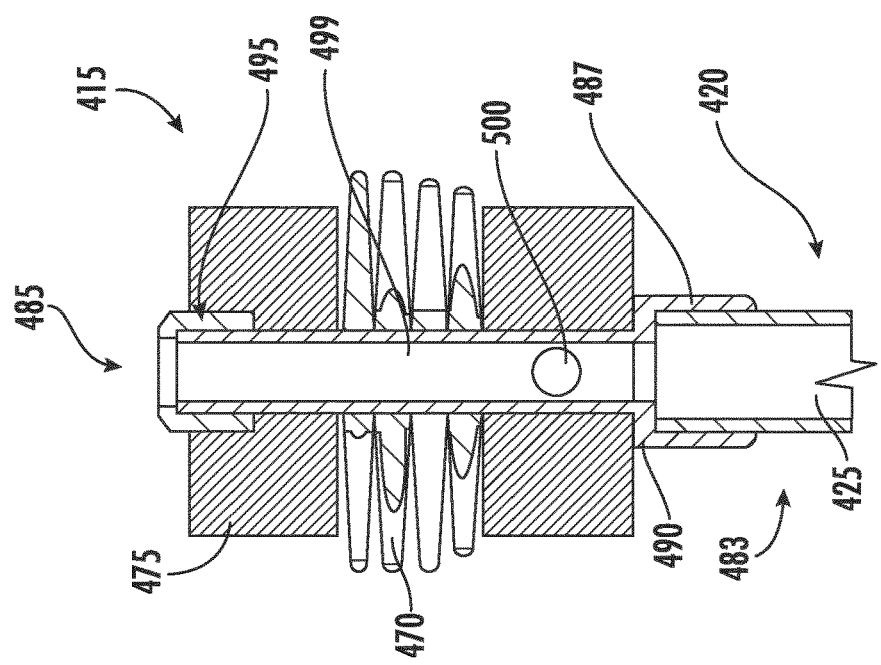
FIG. 48 shows a side cross-sectional view of a brush head for an oral care tool, according to an exemplary embodiment.

FIG. 48 shows a side cross-sectional view of the brush head 415 for the oral care tool 400, according to an exemplary embodiment. In various embodiments, the brush head 415 may include a plurality of engaging or nesting components. As shown, the brush head 415 includes a core portion 490, which is configured to couple to the lumen 425 at the first end 483. As shown, the core portion 490 includes a connecting region 487, which has a larger radius compared to an elongated region 499. The connecting region 487 is configured to fit over and/or engage with the lumen 425 to couple the core portion 490 of the brush head 415 thereto. In various embodiments, the core portion 490 may be removably coupled to the lumen 425 to facilitate changing or replacing of the brush head 415. At the second end 485 of the brush head 415, the core portion 490 may be configured to be integrally formed with or coupled to a cap 495.

In various embodiments, the cap 495 may be configured to fit over and/or engage with the elongated region 499 of the core portion. In various embodiments, the cap 495 may be configured to prevent or facilitate prevention of the foam sections 475 and/or the bristles sections 470 sliding off the second end 485 of the brush head 415. Similarly, the connecting region 487 may be configured to prevent or facilitate prevention of the foam sections 475 and/or the bristles section 470 from sliding off the first end 483 of the brush head 415.

Figure 49:
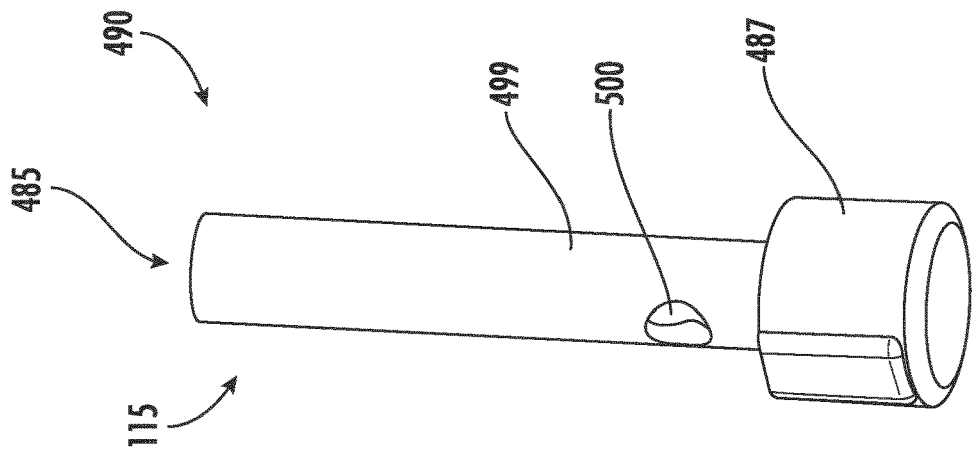
FIG. 49 shows a brush head stem for the oral care tool of FIG. 48, according to an exemplary embodiment.

As illustrated in FIG. 49, which shows a perspective view of the core portion 490, the elongated region 499 within the core portion 490 may include at least one aperture 500 disposed therein (or therethrough), which may be fluidly coupled to the lumen 425. Accordingly, the aperture 500 may enable the brush head 415 to suction fluids from an oral cavity or region such that the suctioned fluid may flow through the brush head 415 and stem portion 420 to eventually exit the oral care tool 400 via the fluid connection portion 440.

Figure 50:
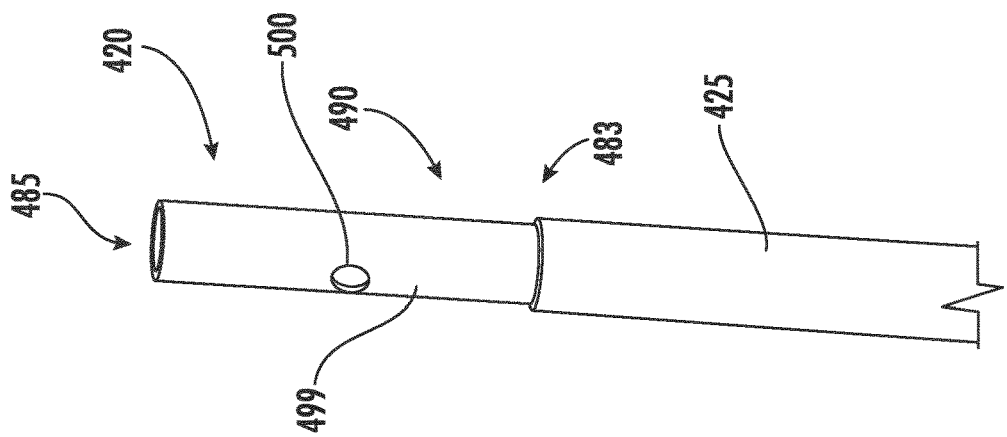
FIG. 50 shows a brush head stem for an oral care tool, according to an exemplary embodiment.

In various embodiments, the core portion 490 may be integrally formed with the lumen 425, as shown in FIG. 50. As illustrated, the elongated region 499 of the core portion 490 may be integrally formed with the lumen 425 at the first end 483. As shown, the elongated region 499 of the core portion 490 may have a smaller radius compared to a radius of the lumen 425 (e.g., to prevent sliding of bristles sections 470 and/or foam sections 475 from sliding from the brush head 415 to the stem portion 420).

Figure 51:
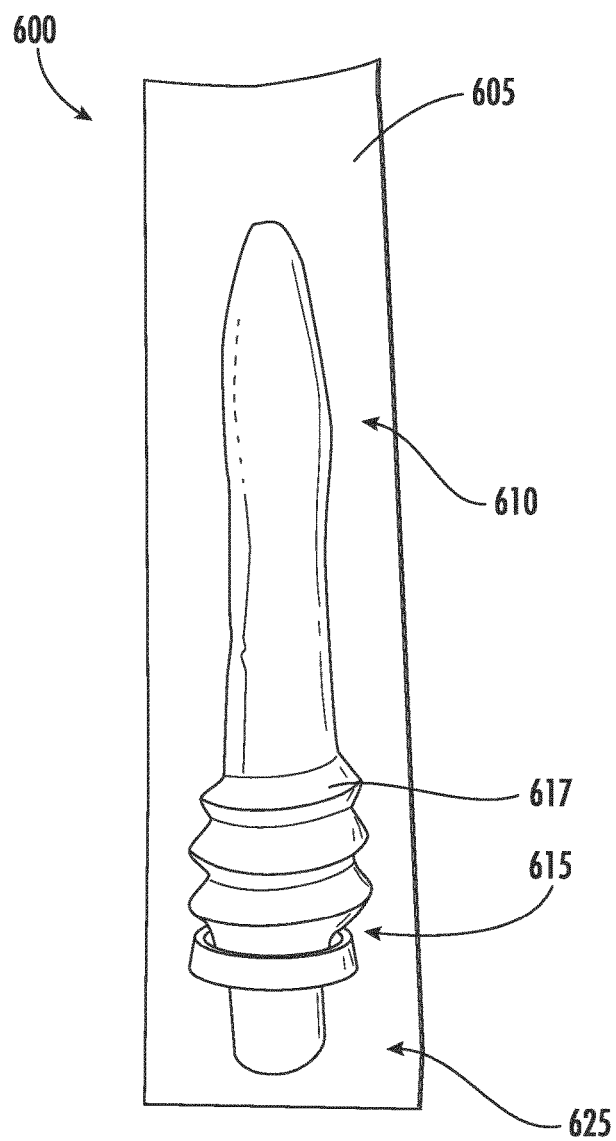
FIGS. 51 and 52 show side and perspective views, respectively of an oral care tool contained within collapsible packaging, according to an exemplary embodiment.
Figure 52:
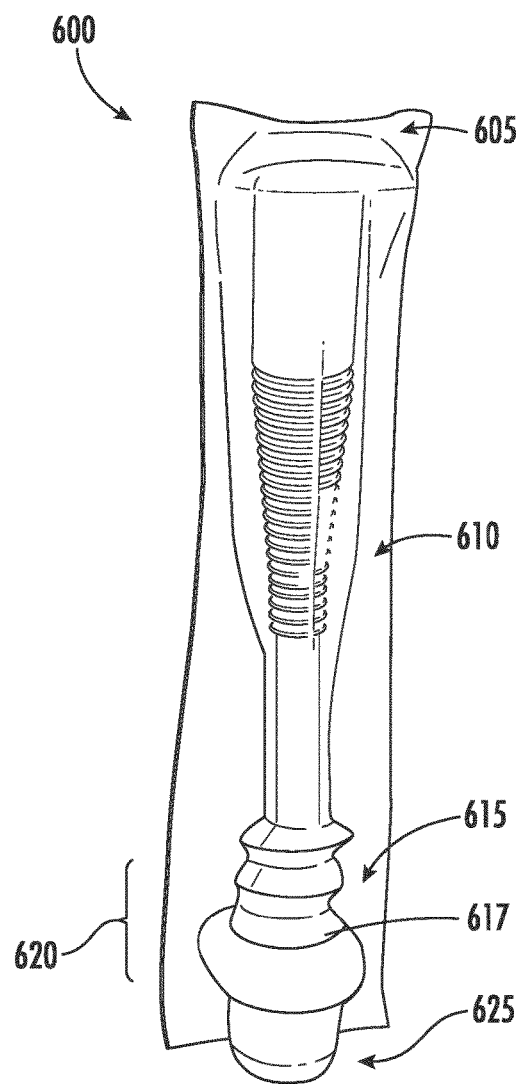

Prior to use, the oral care tool 400 may be stored or contained within a removable package. FIGS. 51 and 52 show side views of an oral care tool package 600 containing the oral care tool 400, according to an exemplary embodiment. As illustrated, the package 600 may include one or more couplable layers 605, which may be configured to mutually couple and encase the oral care tool 400 therein. In various embodiments, the layers 605 may include one or more polymeric, paper, and/or wax-coated layers. In various embodiments, the layers 605 may include a transparent plastic layer coupled to an opaque layer (e.g., paper). In various embodiments, the layers 605 may be coupled using one or more adhesives, heat treatments, or any other methods known in the art suitable for medical applications.

The package 600 may be include one or more regions configured to conform to a shape of the oral care tool 400. As shown in FIG. 51, the package 600 may include an elongated portion 610, which may be configured to conform to a shape of the handle portion 405 (and its one or more grip features 407) and/or a shape of the stem portion 420. The package 600 may further include a collapsible portion 615 disposed adjacent the elongated portion 610, wherein the collapsible portion 615 includes one or more accordion-type ridges 617. The accordion-type ridges 617 may be configured to collapse in response to an applied axial load such that a length 620 of the collapsible portion 615 decreases in the axial direction. The package 600 may further include an end portion 625, which may be configured to conform to a shape of the brush head 415 and/or one or more components coupled thereto. As illustrated in FIG. 52, the collapsible portion 615 may be configured to collapse such that the oral care tool 400 is forced toward the end portion 625 of the package 600.

In various embodiments, the layers 605 may include one or more regions having flaps or tabs to facilitate separation thereof (and, consequently, removal of the oral care tool 400 from the package 600). In various embodiments, the layers 605 of the package 600 may separate when the collapsible portion 615 collapses to enable removal of the oral care tool 400 thereafter. In various embodiments, the package 600 may be sterile or sterilizable.

Figure 55:
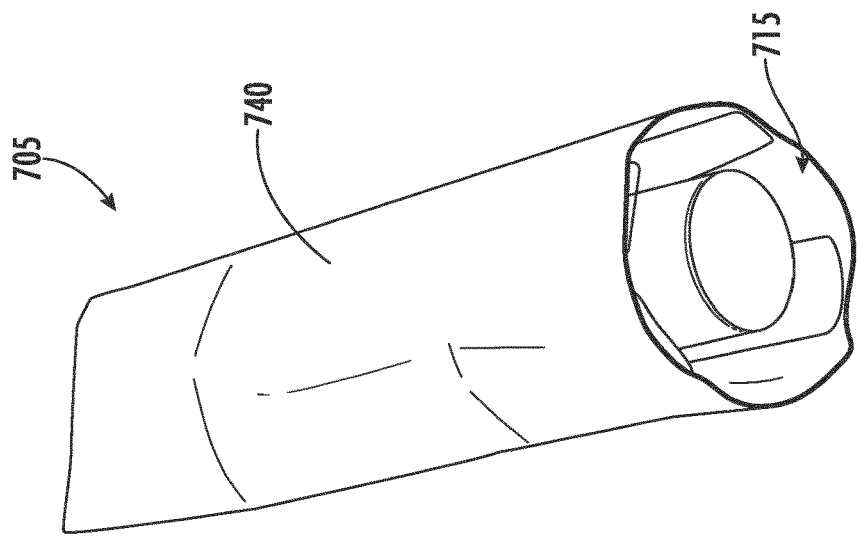
FIGS. 54 and 55 show perspective and end views, respectively, of an oral care tool contained within collapsible packaging, according to an exemplary embodiment.
Figure 54:
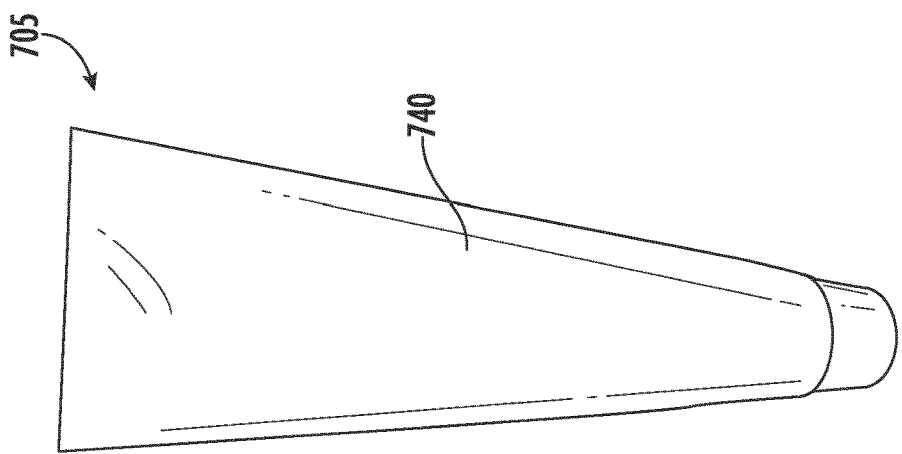
Figure 53:
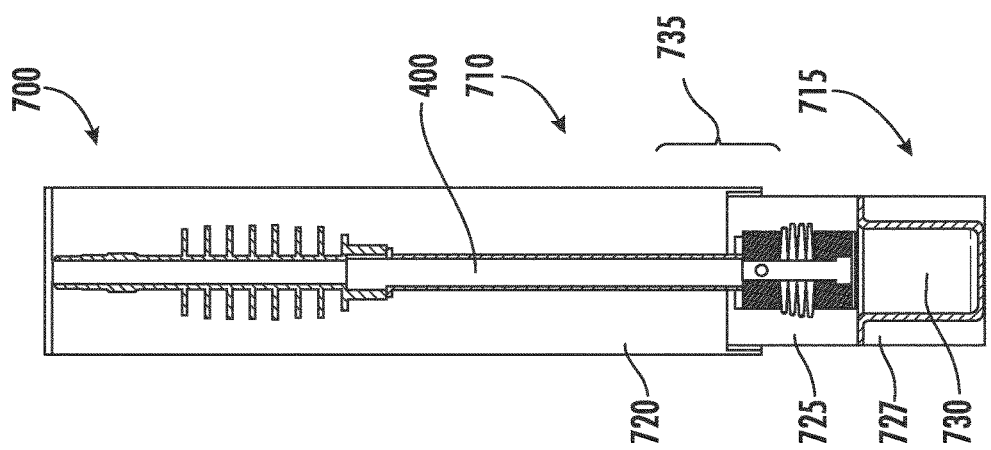
FIG. 53 is a side cross-sectional view of an oral care tool contained within collapsible packaging, according to an exemplary embodiment.

FIGS. 53-55 show side-cross-section, top perspective, and end perspective views, respectively, of another oral care tool package 700 configured to contain an oral care tool 400 (e.g., similar or equivalent to oral care tool 100), according to various exemplary embodiments. As shown in FIG. 53, the package 700 may include an elongated portion 710 configured to encase a handle portion (e.g., similar or equivalent to handle portion) and a stem portion (e.g., similar or equivalent to stem portion 120) of the oral care tool 400 within an inner region 720. As shown, the elongated portion 710 may be slidably coupled to a base portion 715. The base portion 715 may include an upper region 725 and a lower region 727. As shown, the upper region 725 may be configured to engage with the elongated portion 710 of the package 700. The lower region 727 may be configured to include one or more features disposed within an interior region including, but not limited to, a cup 730, which may be configured to store a fluid or oral cleaning solution to be used with the brush head (e.g., similar or equivalent to brush head 115 and/or 415) of the oral care tool 400. Accordingly, the elongated portion 710 of the package 700 may be configured to slide relative to upper region 725 of the base portion 715 within a sliding region 735 such that the oral care tool 400 is displaced toward the cup 730 within the lower region 727 of the base portion 715. Accordingly, the package 700 may enable the oral care tool 400 (e.g., at the brush head 415) to become saturated with an oral cleaning fluid or solution prior to the oral care tool 400 being removed from the oral care package 705. In various embodiments, the base portion 715 may be removable from the elongated portion 710 to enable removal of the oral care tool 400 from the package 700.

As illustrated in FIGS. 54-55, the oral care package 700 may include an outer casing or label 740, which is configured to conform or adhere to the elongated portion 710 and/or base portion 715. In various embodiments, the label 740 may be configured to collapse or slide in response to the elongated portion 710 sliding relative to the base portion 715. In other embodiments, the label 740 may be removed prior to the elongated portion 710 sliding relative to the base portion 715. In various embodiments, the label 740 may be configured to provide a sterile seal between the elongated portion 710 and the base portion 715, such that the package 700 may be substantially impermeable until removal or displacement of the label 740.

Figure 56:
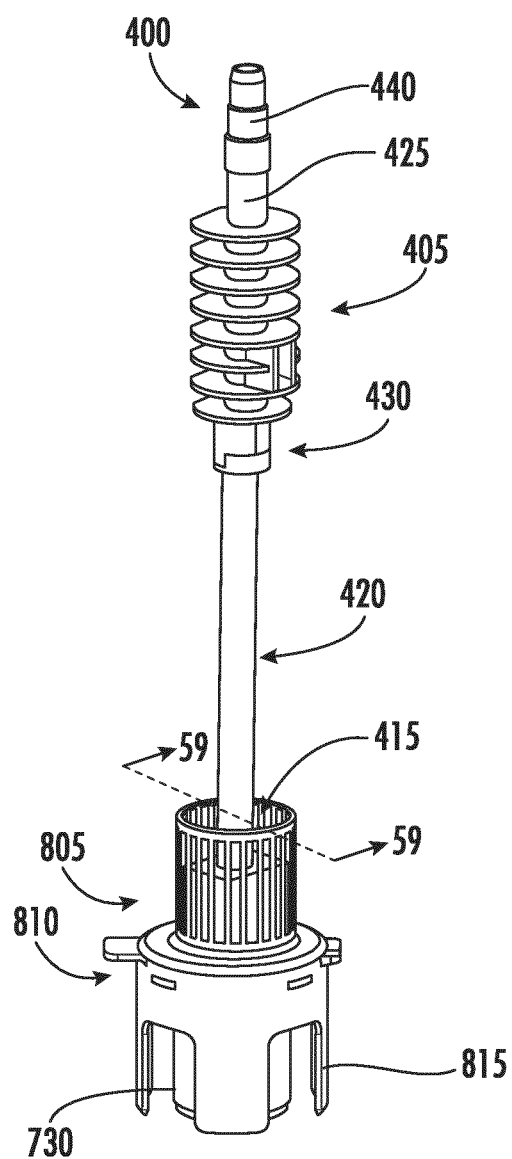
FIGS. 56 and 57 show alternate perspective views of an oral care tool coupled to a plunge cup assembly, according to various exemplary embodiments.
Figure 57:
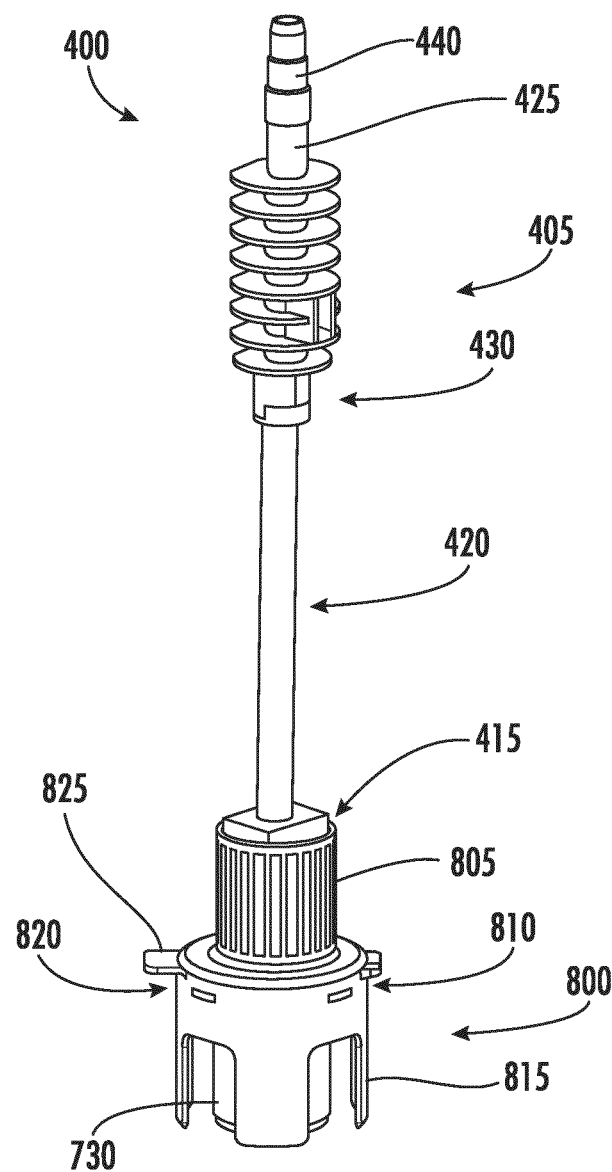

In various embodiments, the cup 730 may include or be coupled to one or more support features to prevent premature entry of the oral care tool 400 (e.g., at the brush head 415) into oral cleaning fluid or solution contained within the cup 730. FIGS. 56 and 57 show perspective views of the oral care tool 400 coupled the cup 730 via a containment assembly 800, according to various exemplary embodiments. As shown, the containment assembly 800 includes a cage portion 805, which is configured to house the brush head 415 of the oral care tool 400. The cage portion 805 is coupled to or integrally formed with a support portion 810, which is configured to surround the cup 730. The support portion 810 may include a plurality of legs 815, which are configured to extend in a perpendicular direction from the support portion 810 and parallel to an axis of the cup 730 and the oral care tool 400. As shown, the legs 815 may enable the oral care tool 400 to stand upright within the cage portion 805 of the containment assembly 800. In various embodiments, the containment assembly 800 and components therein may be partially or entirely comprised of one or more polymeric materials.

As shown in FIG. 57, the containment assembly 800 may further include a protruding feature 825 (e.g., tab), which is coupled to a seal 820. The seal 820 may be configured to prevent the brush head 415 from entering the cup 730. Accordingly, the protruding feature 825 may be displaced (e.g., pulled, bent, flexed, etc.) to enable the brush head 415 to pass through the seal 820 and enter the cup 730 to absorb or soak in the oral cleaning fluid or solution disposed therein.

Figure 58:
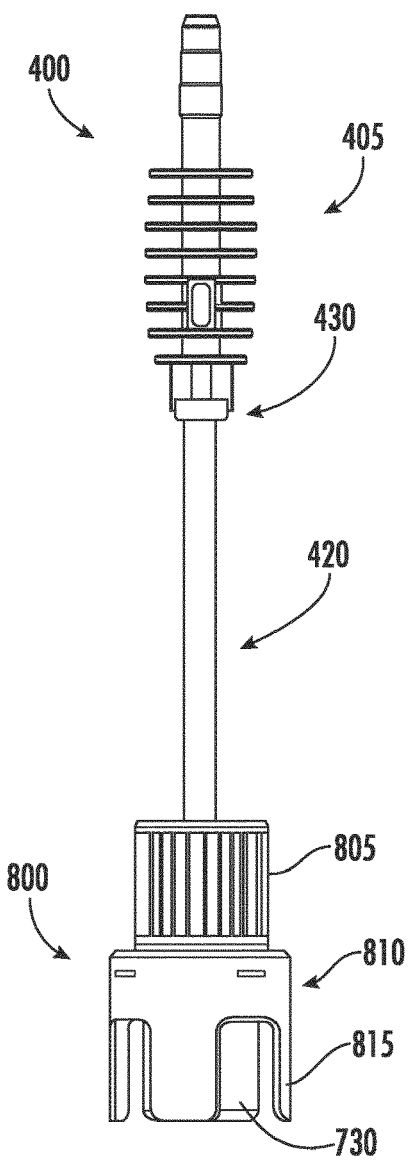
FIG. 58 shows a side view of the oral care tool of FIGS. 56 and 57, according to an exemplary embodiment.
Figure 59:
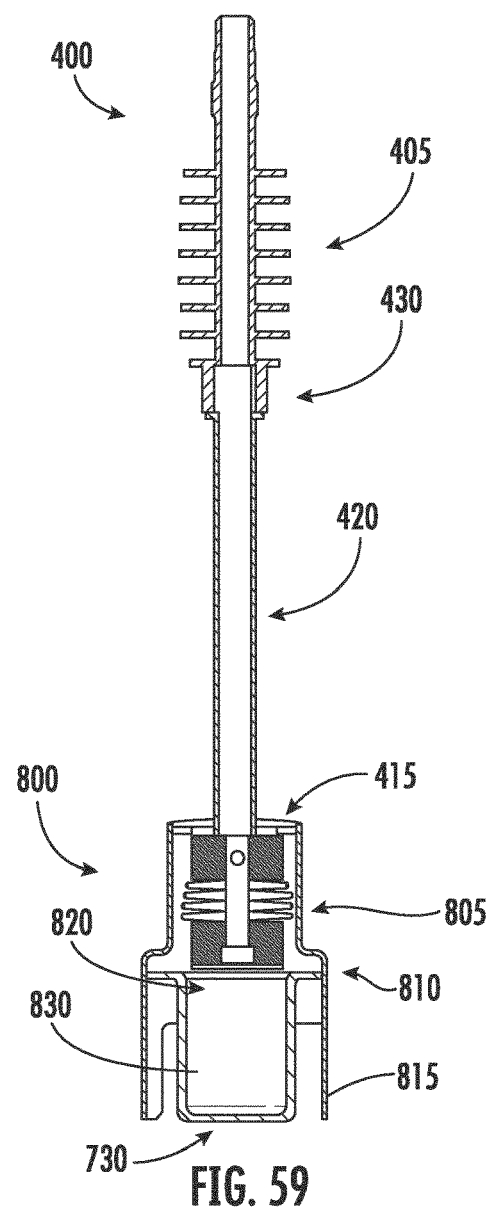
FIG. 59 shows a side cross-sectional view of the oral care tool of FIGS. 56 and 57 taken along line 59-59 of FIG. 56, according to an exemplary embodiment.

FIGS. 58 and 59 show side and cross-sectional views, respectively, of the oral care tool 400 coupled to the containment assembly 800, according to various exemplary embodiments. As illustrated in FIG. 59, which shows a cross-section along line 59-59 of FIG. 56, the brush head 415 of the oral care tool 400 may be disposed within the cage portion 805 above the seal 820 within the support portion 810. As shown, the seal 820 may prevent entry of the brush head 415 into an interior volume 830 of the cup 730. In various embodiments, the seal 820 may be a substrate to be punctured (e.g., film, foil, etc.) responsive to deflection or displacement of the protruding feature 825. In various embodiments, the seal 820 may be retractable or removable responsive to deflection or displacement of the protruding feature 825.

Figure 60:
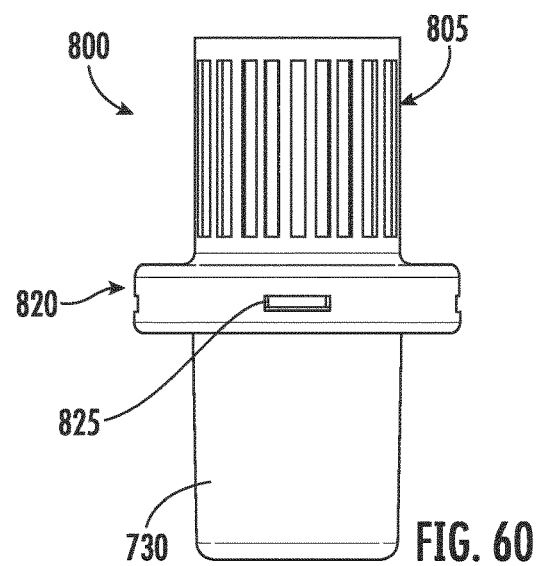
FIG. 60 shows a side view of a plunge cup for an oral care tool, according to an exemplary embodiment.

FIG. 60 shows a side view of the containment assembly 800 with the support portion 810 removed. As illustrated, the cage portion 805 is axially aligned with the cup 730 and separated via the seal 820. Accordingly, prior to use, the oral care tool 400 may be coupled to or engaged with the containment assembly 800 such that the brush head 415 is contained within the cage portion 805 and disposed above the cup 730. Prior to use of the oral care tool 400 (e.g., within an oral cavity), the protruding feature 825 may be deflected or displaced to open the seal 820 and enable the brush head 415 to enter the cup 730 and absorb or soak in the oral cleaning fluid or solution contained therein. In various embodiments, the oral care tool 400 (or, alternatively, oral care tool 100) may be packaged or stored within package 600 or 700 coupled to or engaged with the containment assembly 800. In various embodiments, sliding or collapsing of components within package 600 and/or 700 may cause deflection or displacement of the protruding feature 825 within the containment assembly 800 to cause the brush head 415 to enter the cup 730.

Figure 63:
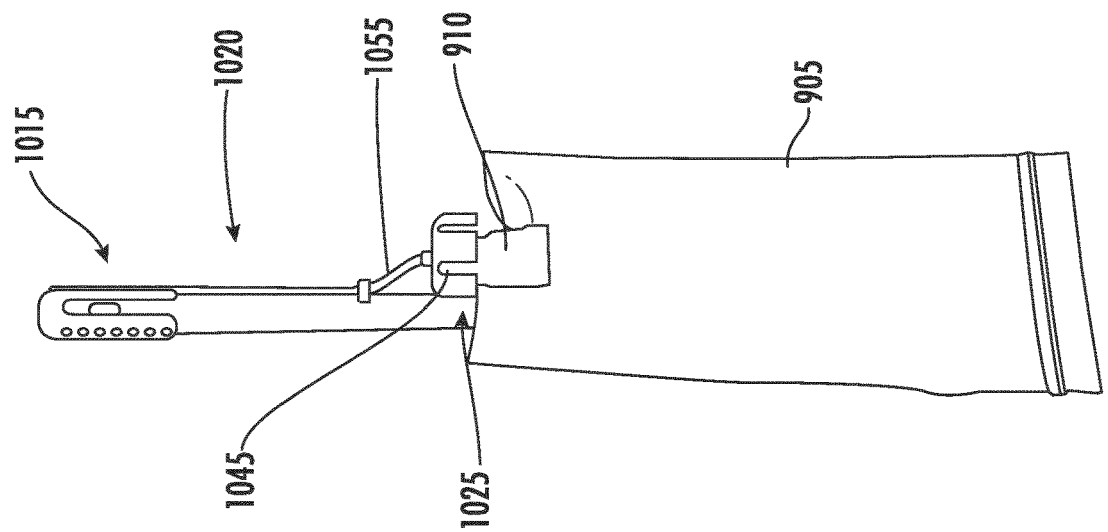
FIGS. 62-63 show front and rear views of the fluid reservoir of FIG. 61 coupled to an oral care tool, according to an exemplary embodiment.
Figure 62:
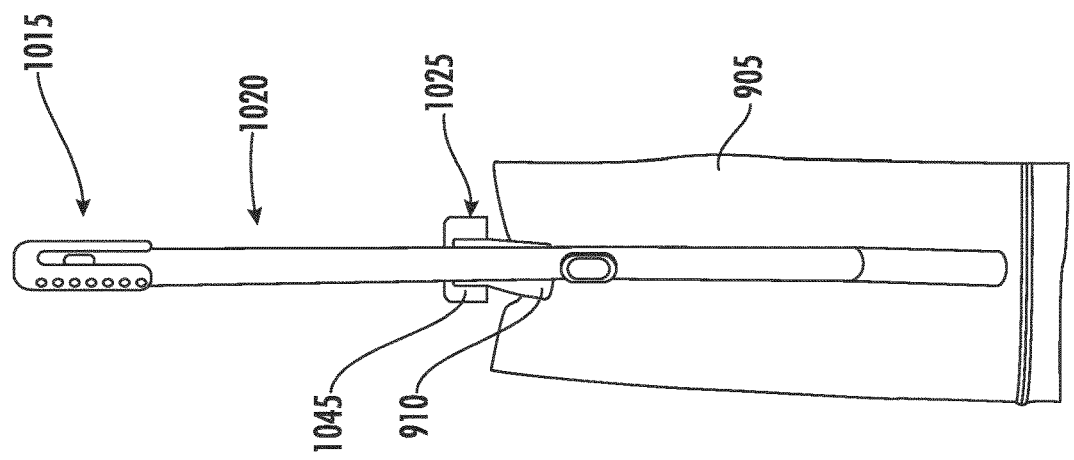
Figure 61:
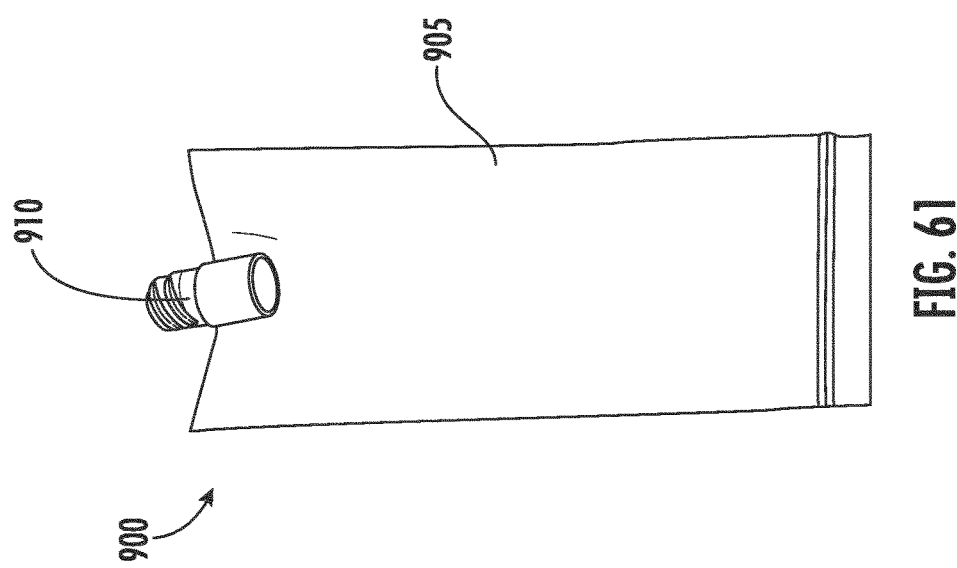
FIG. 61 shows a front view of a fluid reservoir for an oral care tool, according to an exemplary embodiment.

In various embodiments, the oral care tool 400 (or, alternatively, oral care tool 100) may be fluidly coupled to a fluid reservoir, which may contain oral cleaning fluid or solution. FIG. 61 shows a front view of a fluid reservoir 900, according to an exemplary embodiment. As shown, the fluid reservoir 900 may include a pouch 905 having a fluid connector 910 coupled thereto. As shown in FIGS. 62 and 63, which show front and rear views, respectively, of the fluid reservoir 900 coupled to a second lumen 1055 (e.g., similar or equivalent to lumen 155) disposed parallel to the lumen 1025 (e.g., similar or equivalent to lumen 125 and/or 425) within a stem portion 1020 (e.g., similar or equivalent to stem portions 120 and/or 420) and fluidly coupled to a brush head 1015 (e.g., similar or equivalent to brush head 415 and/or 115). As illustrated, the fluid reservoir 900 may be coupled to the lumen 1055 via a cap 1045 (e.g., similar or equivalent to cap 145). Accordingly, the fluid reservoir 900 may be configured to provide oral cleaning fluid or solution to the brush head 1015 via the lumen 1055 upon coupling of the fluid connector 910 to the cap 1045. In various embodiments, the fluid connector 910 may be configured to press fit, screw into, or otherwise couple to the cap 1045 to enable fluid within the pouch 905 to enter the lumen 1055. In various embodiments, the pouch 905 of the fluid reservoir 900 may be configured as a single, double, or multi-burst pouch having one or more compartments disposed therein. In various embodiments, each of the one or more compartments disposed within the pouch 905 may contain one or more oral cleaning fluids or solutions. Accordingly, during use, the fluid reservoir 900 may be fluidly coupled to the lumen 1055 at the cap 1045 via the fluid connector 910. The pouch 905 may then be compressed (e.g., squeezed) to cause the one or more oral cleaning fluids or solutions contained within each of the one or more compartments to mix and flow through the fluid connector 910 into the lumen 1055 and, subsequently, the brush head 1015. In various embodiments, the fluid reservoir 900 may be compressed to cause mixing of the contained oral cleaning fluids or solutions contained therein prior to fluid coupling to the lumen 1025. In various embodiments, the one or more compartments may be compressed sequentially to enable the one or more contained fluids to flow to the lumen 1055 in a corresponding sequential order to facilitate cleaning of an oral cavity and anatomy contained therein.

Notwithstanding the embodiments described above in reference to FIGS. 1-63, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. An oral care device comprising:
a lumen;
a stem having a longitudinal axis; and
a brush head coupled to a distal end of the lumen, the brush head comprising:
    a plurality of bristles sections structured to debride surfaces within an oral cavity, each of the bristles sections comprising a plurality of bristles extending radially outward from the longitudinal axis, and
    a plurality of foam sections structured to absorb fluid within the oral cavity, each of the foam sections positioned between two of the bristles sections, the foam sections and the bristles sections being arranged circumferentially around the longitudinal axis.

2. The oral care device of claim 1, wherein the brush head comprises six outwardly facing sides such that a cross-section of the brush head is hexagonal; and
    wherein each of the six outwardly facing sides comprises one of the bristles sections or one of the foam sections.

3. The oral care device of claim 1, wherein the brush head further comprises an aperture extending transversely through the brush head, the aperture being fluidly coupled to the lumen and configured to facilitate suction of fluid.

4. The oral care device of claim 3, wherein the aperture extends through a face of the brush head including at least one of the bristles sections.

5. The oral care device of claim 1, wherein the brush head further comprises an end foam section, the end foam section being coupled to a terminal end of the brush head.

6. The oral care device of claim 5, wherein the end foam section is integrally formed with the foam sections.

7. The oral care device of claim 1, wherein:
the brush head further comprises a brush head stem; and
each of the foam sections is coupled to the brush head stem via an adhesive absorbed within a portion of each of the foam sections.

8. The oral care device of claim 1, wherein the bristles sections and the foam sections are disposed in a helical arrangement along the brush head.

9. The oral care device of claim 1, wherein the brush head further comprises:
    a first set of faces arranged around the longitudinal axis, each of the first set of faces including one of the bristles sections; and
    a second set of faces arranged around the longitudinal axis, each of the second set of faces including one of the foam sections, each of the second set of faces disposed in an alternating arrangement with each of the first set of faces.

10. The oral care device of claim 9, wherein each of the first set of faces comprises a plurality of apertures, each of the apertures configured to receive a portion of one of the bristles sections.

11. The oral care device of claim 1, wherein the lumen comprises a first lumen and a second lumen coupled to the first lumen, the first lumen being configured to bend relative to the second lumen.

12. The oral care device of claim 11, wherein the first lumen and the second lumen form a continuous piece, the first lumen and the second lumen being joined by a flex portion; and
    wherein the flex portion has increased deformability as compared to either of the first lumen or the second lumen.

13. The oral care device of claim 12, wherein a circumference of the flex portion is less than either a circumference of the lumen or a circumference of the brush head.

14. An oral device kit comprising:
a fluid reservoir; and
an oral care device configured to receive fluid from the fluid reservoir, the oral care device comprising:
    a lumen coupled to the fluid reservoir,
    a stem having a longitudinal axis, and
    a brush head coupled to the lumen, the brush head comprising:
        a plurality of bristles sections structured to debride surfaces within an oral cavity, each of the bristles sections comprising a plurality of bristles extending radially outward from the longitudinal axis, and
        a plurality of foam sections structured to absorb fluid within the oral cavity, each of the bristles sections and each of the foam sections being arranged such that the brush head is axially symmetric about the longitudinal axis.

15. The oral device kit of claim 14, wherein the fluid reservoir is fluidly coupled to the brush head, the fluid reservoir configured to deliver fluid to the brush head responsive to deformation applied to the fluid reservoir.

16. The oral device kit of claim 15, further comprising a cap coupled to a side of the lumen, the cap configured to receive an end of the fluid reservoir.

17. The oral device kit of claim 16, wherein the cap comprises a cuspate portion configured to puncture the fluid reservoir.

18. The oral device kit of claim 14, wherein the brush head further comprises:
    a first set of faces arranged around the longitudinal axis, each of the first set of faces including one of the bristles sections; and
    a second set of faces arranged around the longitudinal axis, each of the second set of faces including one of the foam sections, each of the second set of faces disposed in an alternating arrangement with each of the first set of faces.

19. The oral device kit of claim 15, wherein the brush head further comprises an aperture extending transversely through the brush head;

wherein the lumen comprises a first lumen and a second lumen coupled to the first lumen;

wherein the first lumen is fluidly coupled to the fluid reservoir such that the first lumen is configured to receive fluid from the fluid reservoir and deliver the fluid to the brush head; and wherein the second lumen is fluidly coupled to the aperture and configured to suction fluid therethrough.

20. The oral care device of claim 14, wherein:

the brush head further comprises a brush head stem; and each of the foam sections is coupled to the brush head stem via an adhesive absorbed within a portion of each of the foam sections.

\* \* \* \* \*